United States Patent [19]

Malmgren et al.

[11] 3,939,309

[45] Feb. 17, 1976

[54] COMMUNICATION SWITCHING SYSTEM DATA RETRIEVAL AND LOADING ARRANGEMENT

[75] Inventors: William A. Malmgren, Glendale Heights, Ill.; Bryan F. Gearing, Bedford, Mass.

[73] Assignee: GTE Automatic Electric Laboratories Incorporated, Northlake, Ill.

[22] Filed: Jan. 18, 1974

[21] Appl. No.: 434,742

[52] U.S. Cl. .......................... 179/18 ES; 179/7 MM
[51] Int. Cl.² .................... H04M 15/06; H04Q 3/54
[58] Field of Search 179/7 MM, 8 R, 18 EB, 18 ES; 340/172.5

[56] References Cited
UNITED STATES PATENTS

| | | | |
|---|---|---|---|
| 3,737,873 | 6/1973 | Puccini | 340/172.5 |
| 3,813,495 | 5/1974 | Conerly | 179/7 MM |

*Primary Examiner*—Thomas A. Robinson

[57] ABSTRACT

A data retrieval and loading arrangement for a communication switching system, such as a telephone system, having common equipment with storage areas containing program information blocks for facilitating the establishment of connections through the system switching network and for generating ticketing information in response to a ticketing connection scanning unit, includes information storage equipment, which in the disclosed embodiment is magnetic tape recording equipment, for storing the ticketing information and the program information blocks via a peripheral adapter unit in response to the common equipment, and a status register responsive to directive information from the common equipment for controlling the adapter unit to transfer to the storage equipment either the ticketing information or the program information blocks. New program information blocks from other ones of the program memory units may be transferred to the storage areas of the common equipment for storage therein.

13 Claims, 25 Drawing Figures

FIG. IA

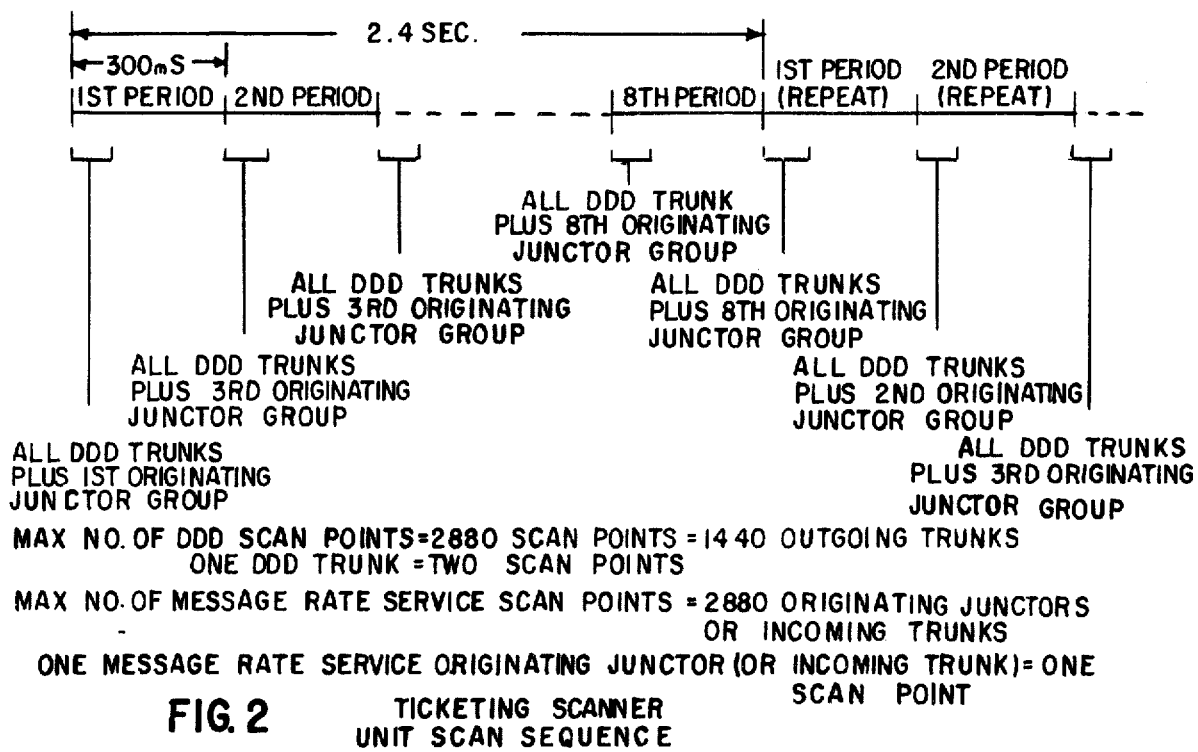
MAX NO. OF DDD SCAN POINTS = 2880 SCAN POINTS = 1440 OUTGOING TRUNKS
ONE DDD TRUNK = TWO SCAN POINTS
MAX NO. OF MESSAGE RATE SERVICE SCAN POINTS = 2880 ORIGINATING JUNCTORS OR INCOMING TRUNKS
ONE MESSAGE RATE SERVICE ORIGINATING JUNCTOR (OR INCOMING TRUNK) = ONE SCAN POINT
FIG. 2  TICKETING SCANNER UNIT SCAN SEQUENCE
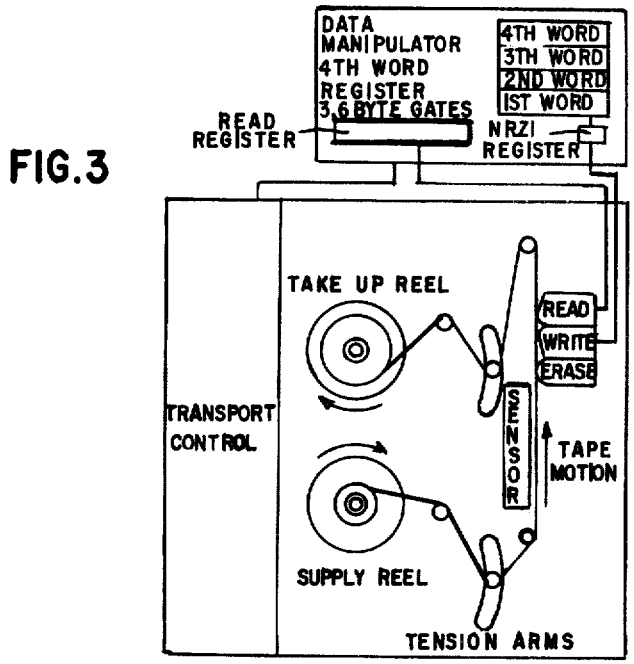
FIG. 3

TRUNK CALL RECORD TABLE (STORED ON DRUM)

ORIGINATING JUNCTOR CALL RECORD TABLE (STORED ON DRUM)

INFORMATION INTERCHANGE CODE USED TO FORMULATE
A NINE TRACK MAGNETIC TAPE RECORDING

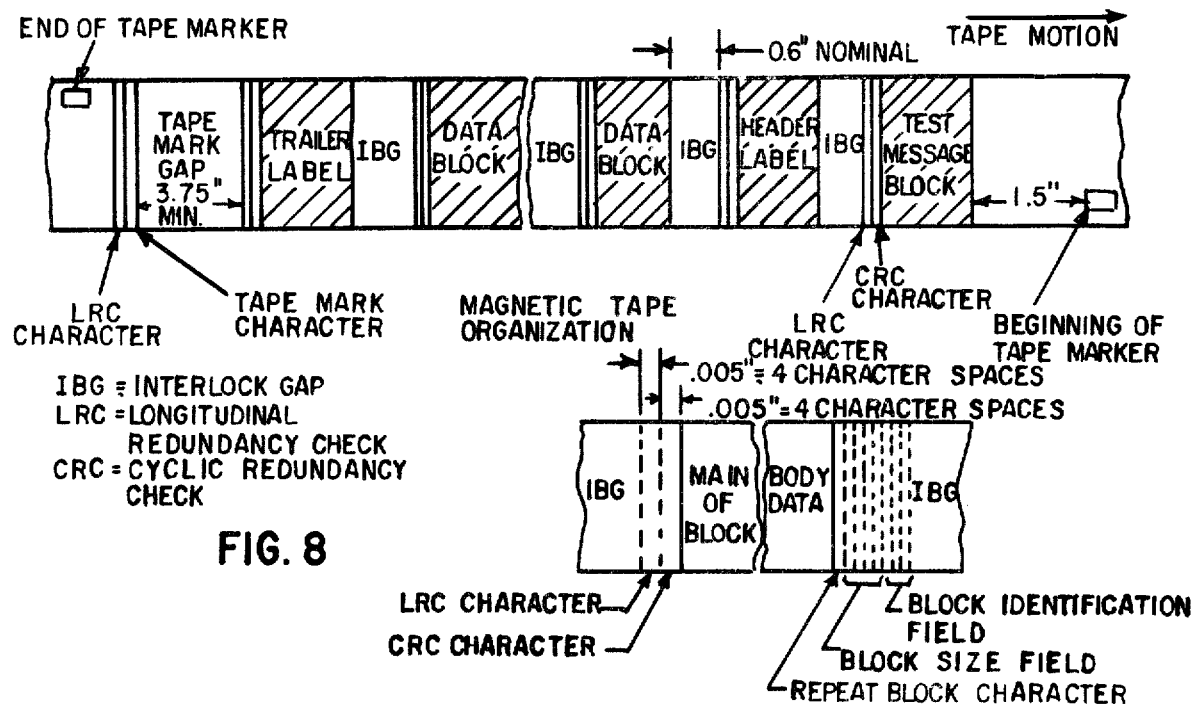

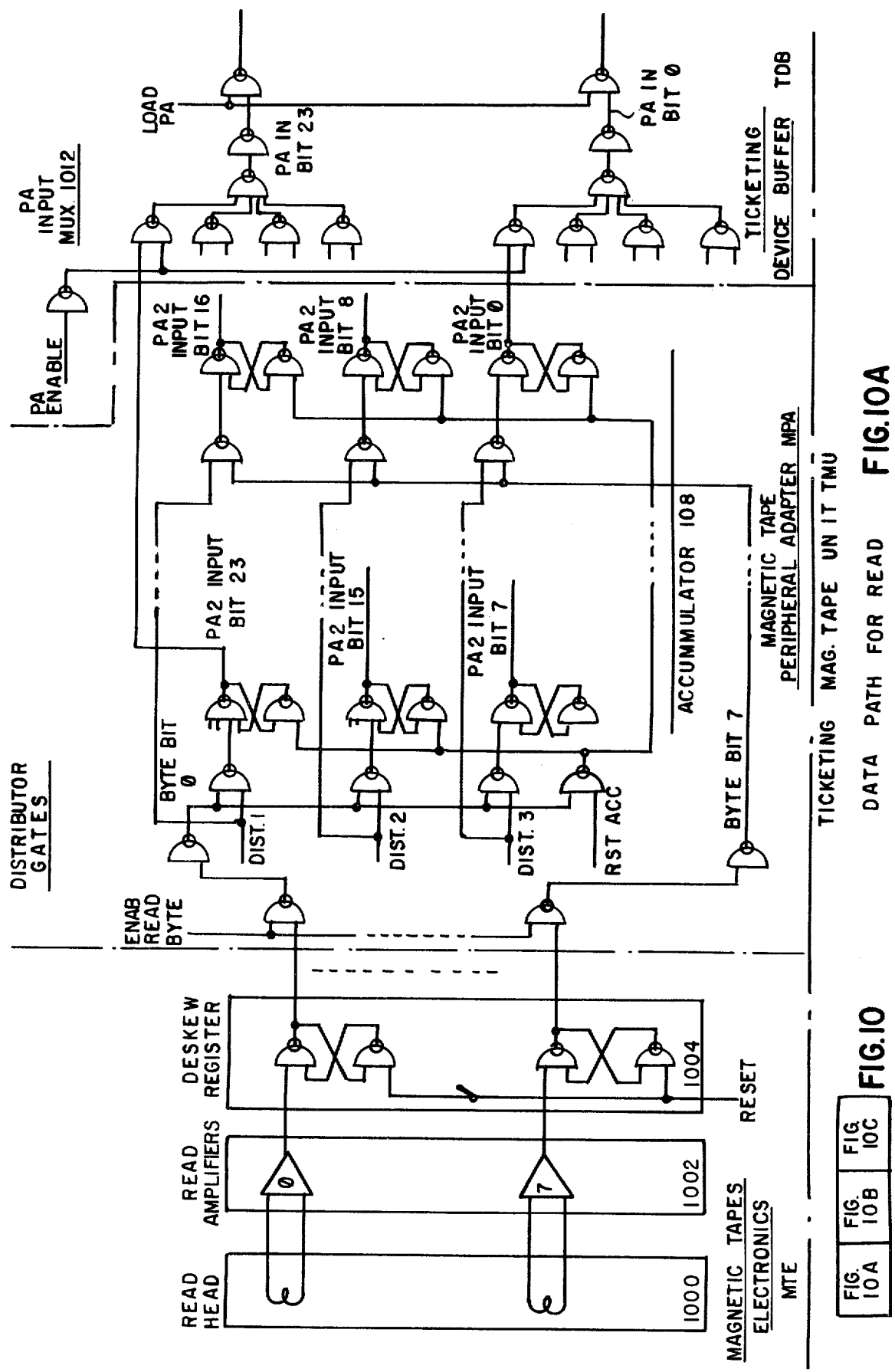

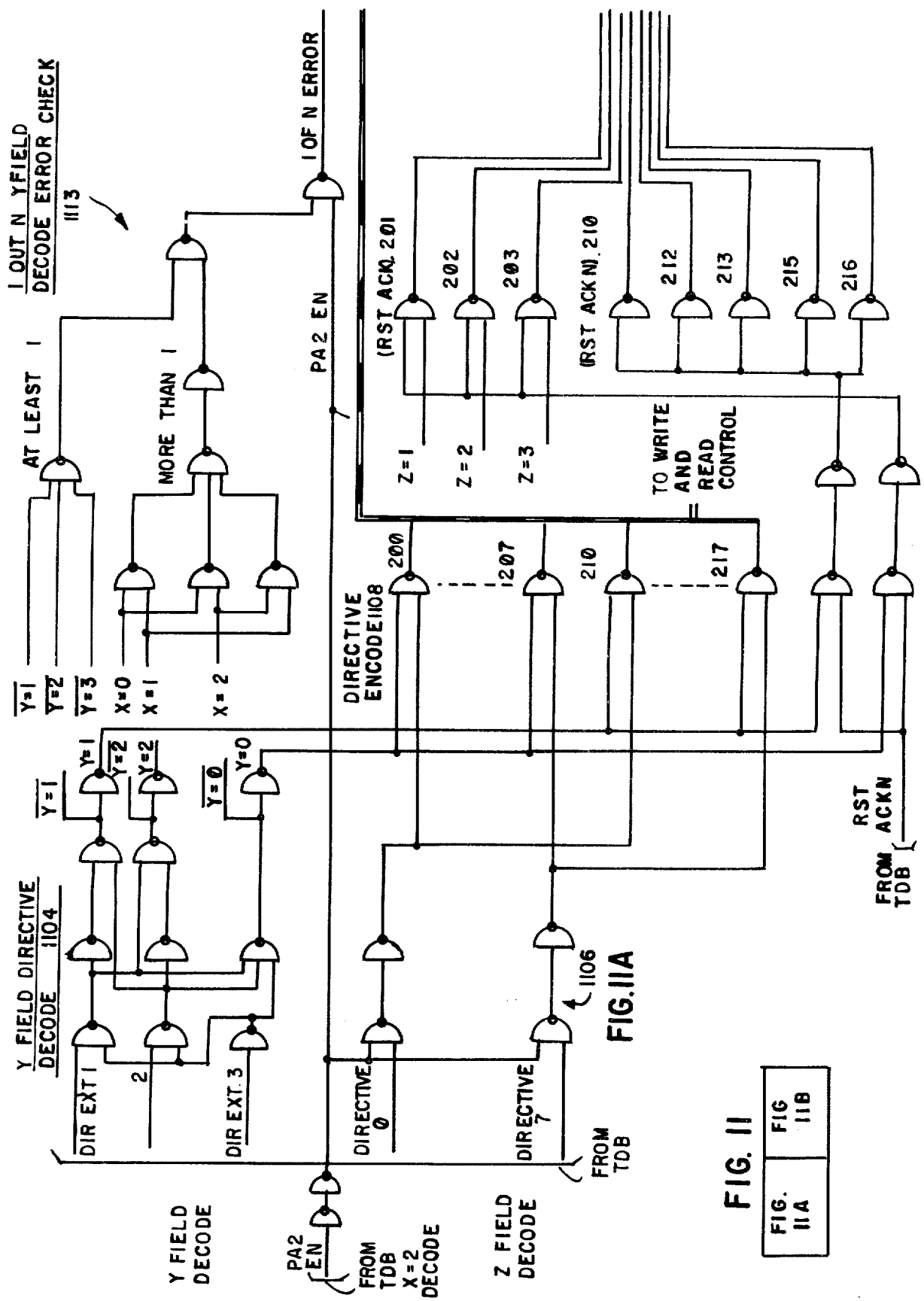

READ CONTROL

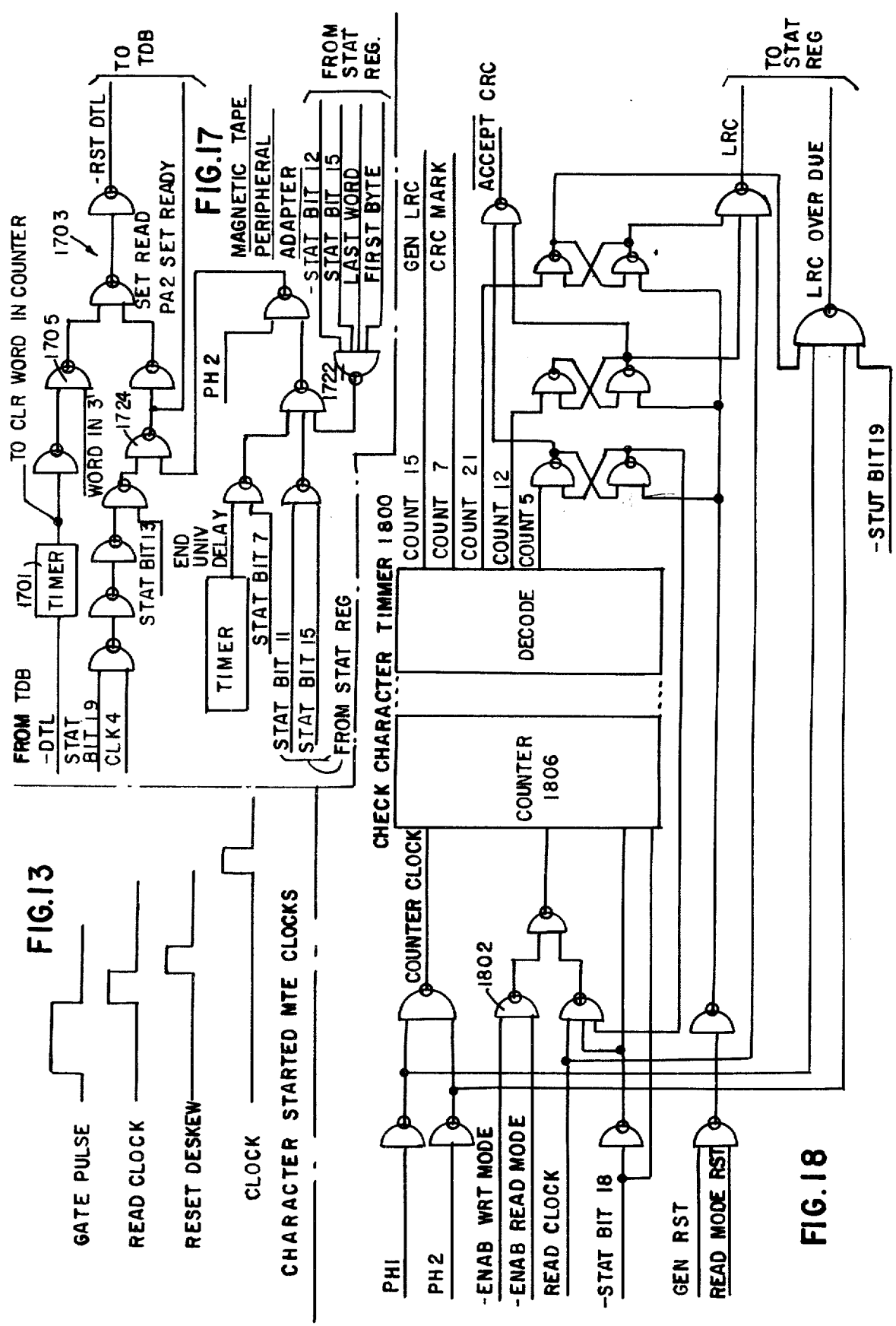

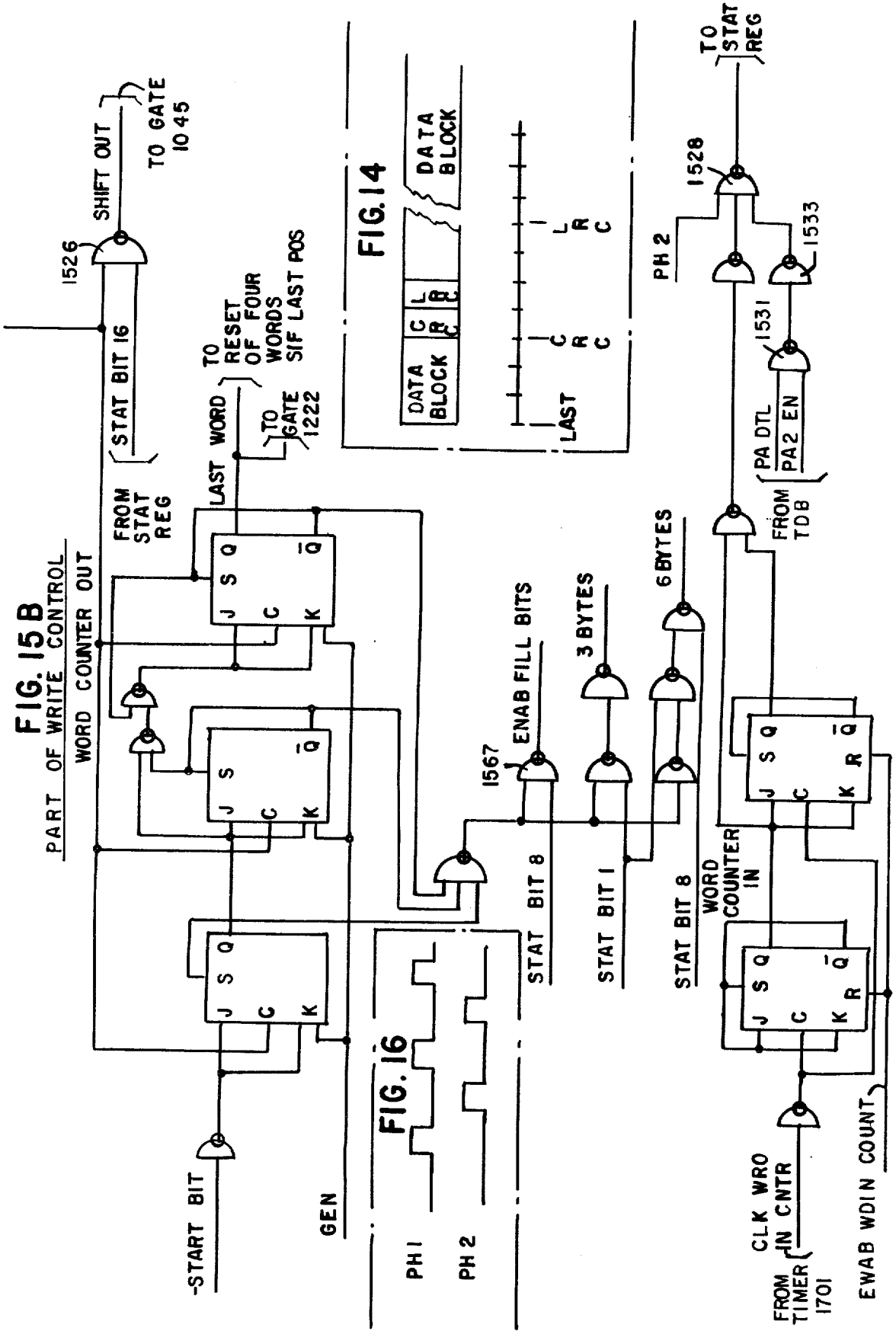

COMMUNICATION SWITCHING SYSTEM DATA RETRIEVAL AND LOADING ARRANGEMENT

BACKGROUND OF THE INVENTION

1. Field of the Invention

This invention relates to a communication switching system data retrieval and loading arrangement, and it more particularly relates to an arrangement for recording call ticketing information concerning completed connections through a communication switching system, such as a telephone system.

2. Description of the Prior Art

Communication switching systems, such as telephone systems, have employed scanning equipment for monitoring various different circuits of the system so as to derive ticketing information for billing subscribers for their use of the system. The ticketing information is then transferred to and recorded on a tape, such as a perforated tape, for subsequent use in preparing subscriber bills. The systems have included equipment for writing the ticketing information on the tape. The system also includes a stored program central processor used for normal call processing purposes and also for formulating the ticketing information according to ticketing program information stored in the system processor storage areas. The system programs, including call processing and ticketing programs as well as all other programs, have been loaded and retrieved from the system via conventional computer input/output devices. While such an arrangement may be satisfactory for some applications, it would be highly desirable to combine the program loading and retrieving apparatus with the ticketing equipment for more efficient and economical use of the system.

SUMMARY OF THE INVENTION

Therefore, the principal object of the present invention is to provide a new and improved communication switching system data retrieval and loading arrangement for both the recording of ticketing information and the loading and retrieving of programs into and out of the system processor storage areas. Another object of the present invention is to provide such a new and improved communication switching system data retrieval and loading arrangement, which employs magnetic tape for both system ticketing purposes and the loading and retrieving of system programs in an efficient and economical manner.

CROSS-REFERENCES TO RELATED APPLICATIONS AND PATENTS

The preferred embodiment of the invention is incorporated in a COMMUNICATION SWITCHING SYSTEM WITH MARKER, REGISTER AND OTHER SUBSYSTEMS COORDINATED BY A STORED PROGRAM CENTRAL PROCESSOR, U.S. patent application Ser. No. 342,323, filed Mar. 19, 1973 now U.S. Pat. No. 3,835,260 issued Sept. 11, 1974, hereinafter referred to as the SYSTEM application. The system may also be referred to as No. 1 EAX or simply EAX.

The memory access, and the priority and interrupt circuits for the register-sender subsystem are covered by U.S. Pat. No. 3,729,715 issued Apr. 24, 1973 by C. K. Buedel for a MEMORY ACCESS APPARATUS PROVIDING CYCLIC SEQUENTIAL ACCESS BY A REGISTER SUBSYSTEM AND RANDOM ACCESS BY A MAIN PROCESSOR IN A COMMUNICATION SWITCHING SYSTEM, hereinafter referred to as the REGISTER-SENDER MEMORY CONTROL patent. The register-sender subsystem is described in U.S. Pat. No. 3,737,873 issued June 5, 1973 by S. E. Puccini for DATA PROCESSOR WITH CYCLIC SEQUENTIAL ACCESS TO MULTIPLEXED LOGIC AND MEMORY, hereinafter referred to as the REGISTER-SENDER patent.

The marker for the system is disclosed in the U.S. Pat. No. 3,681,537, issued Aug. 1, 1972 by J. W. Eddy, H. G. Fitch, W. F. Mui and A. M. Valente for a MARKER FOR COMMUNICATION SWITCHING SYSTEM, and U.S. Pat. No. 3,678,208, issued July 18, 1972 by J. W. Eddy for a MARKER PATH FINDING ARRANGEMENT INCLUDING IMMEDIATE RING; and also in U.S. patent applications Ser. No. 281,586 filed Aug. 17, 1972 now U.S. Pat. No. 3,806,659 issued Apr. 23, 1974 by J. W. Eddy for an INTERLOCK ARRANGEMENT FOR A COMMUNICATION SWITCHING SYSTEM, Ser. No. 311,606 filed Dec. 4, 1972 now U.S. Pat. No. 3,830,983 issued Aug. 20, 1974 by J. W. Eddy and S. E. Puccini for a COMMUNICATION SYSTEM CONTROL TRANSFER ARRANGEMENT Ser. No. 303,157 filed Nov. 2, 1972 now U.S. Pat. No. 3,809,822 issued May 9, 1974 by J. W. Eddy and S. E. Puccini for a COMMUNICATION SWITCHING SYSTEM INTERLOCK ARRANGEMENT, hereinafter referred to as the MARKER patents and applications.

The communication register and the marker transceivers are described in U.S. patent application Ser. No. 320,412 filed Jan. 2, 1973 now U.S. Pat. No. 3,814,859 issued June 4, 1974 by J. J. Vrba and C. K. Buedel for a COMMUNICATION SWITCHING SYSTEM TRANSCEIVER ARRANGEMENT FOR SERIAL TRANSMISSION, hereinafter referred to as the COMMUNICATIONS REGISTER patent application.

The executive or operating system of the stored program processor is disclosed in U.S. patent application Ser. No. 347,281 filed Apr. 2, 1973 by C. A. Kalat, E. F. Wodka, A. W. Clay, and P. R. Harrington for STORED PROGRAM CONTROL IN A COMMUNICATION SWITCHING SYSTEM, hereinafter referred to as the EXECUTIVE patent application.

The computer line processor is disclosed in U.S. patent application Ser. No. 347,966 filed Apr. 4, 1973 now U.S. Pat. No. 3,831,151 issued Aug. 20, 1974 by L. V. Jones and P. A. Zelinski for a SENSE LINE PROCESSOR WITH PRIORITY INTERRUPT ARRANGEMENT FOR DATA PROCESSING SYSTEMS.

Programs for communication between the data processing unit and the register-sender, in addition to the SYSTEM application, are disclosed in U.S. patent application Ser. No. 358,753 filed May 9, 1973 now U.S. Pat. No. 3,819,865 issued June 24, 1974 by F. A. Weber et al.

The scanner for the local automatic message accounting subsystem is disclosed in patent application Ser. No. 434,743, filed Jan. 18, 1974 by B. F. Gearing, M. R. Winandy, G. Grzybowski and D. F. Gaon; and in two articles in the GTE Automatic Electric Technical Journal, Vol. 13, No. 4, (October, 1972) at pages 177–184 and pages 185–196.

The above patents, patent applications, and articles are incorporated herein and made a part hereof as though fully set forth.

DESCRIPTION OF THE DRAWINGS

The above-mentioned and other objects and features of this invention and the manner of attaining them will become apparent, and the invention itself will be best understood by reference to the following description of an embodiment of the invention, wherein:

FIG. 1A is a block diagram of the communication switching system in which the subsystem of FIG. 1 may be incorporated;

FIG. 3 is a schematic drawing of the magnetic tape transport of the subsystem of FIG. 1;

FIGS. 5–9 are various different charts and schematic representations useful in the understanding of the present invention; and FIGS. 10 through 18 are detailed functional block diagrams and charts of the magnetic tape peripheral adapter portion of the subsystem of FIG. 1.

FIGS. 10A–10C are to be oriented as depicted in FIG. 10; FIGS. 11A–11B as depicted in FIG. 11; and FIGS. 15A–15B as depicted in FIG. 15.

DESCRIPTION OF THE PREFERRED EMBODIMENT

Figure 1:
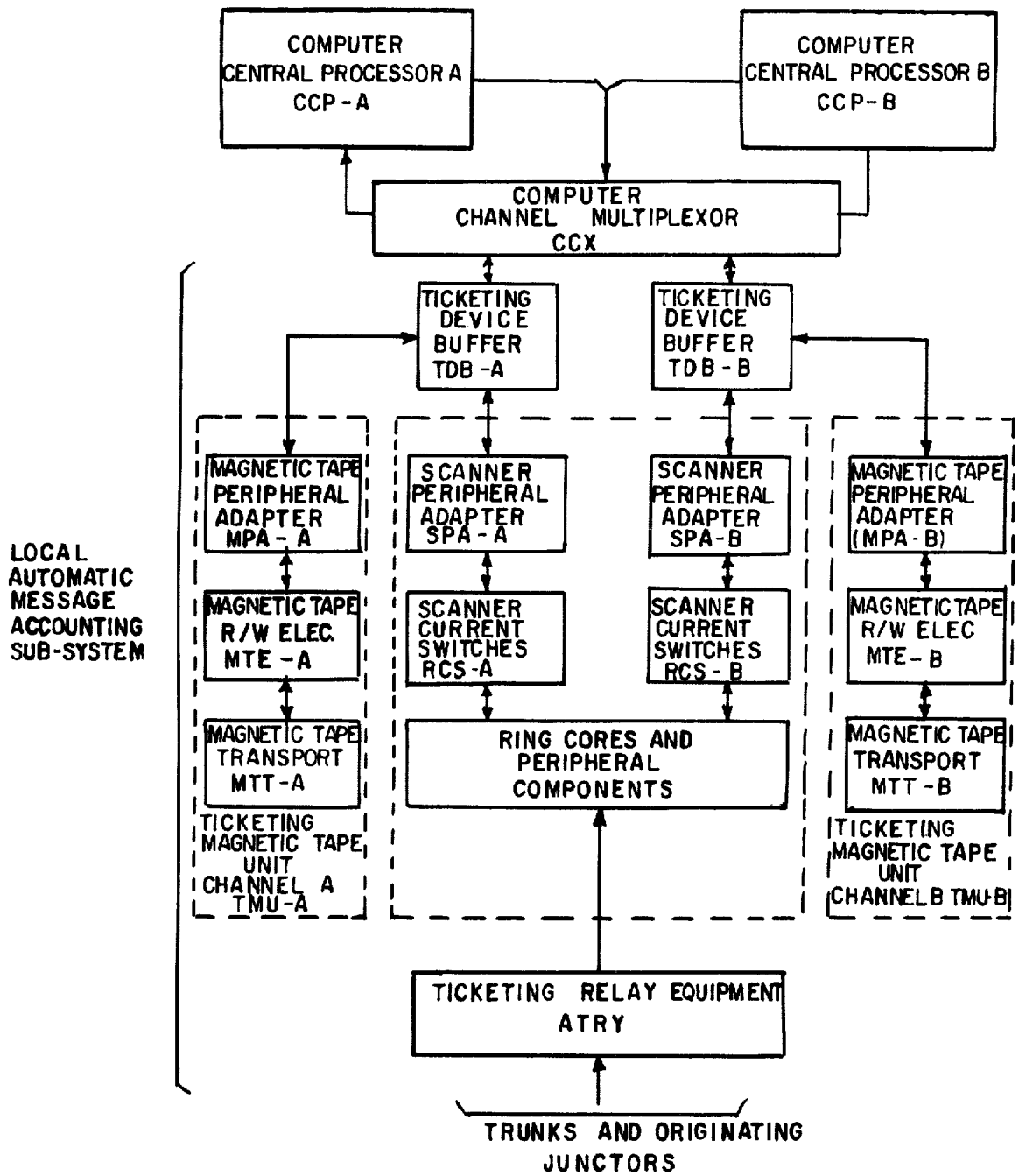
FIG. 1 is a block diagram of a local automatic message accounting subsystem constructed in accordance with the present invention, the subsystem being illustrated in a manner to show its interconnection with the duplicated central processors of the communication switching system.
Figure 2:
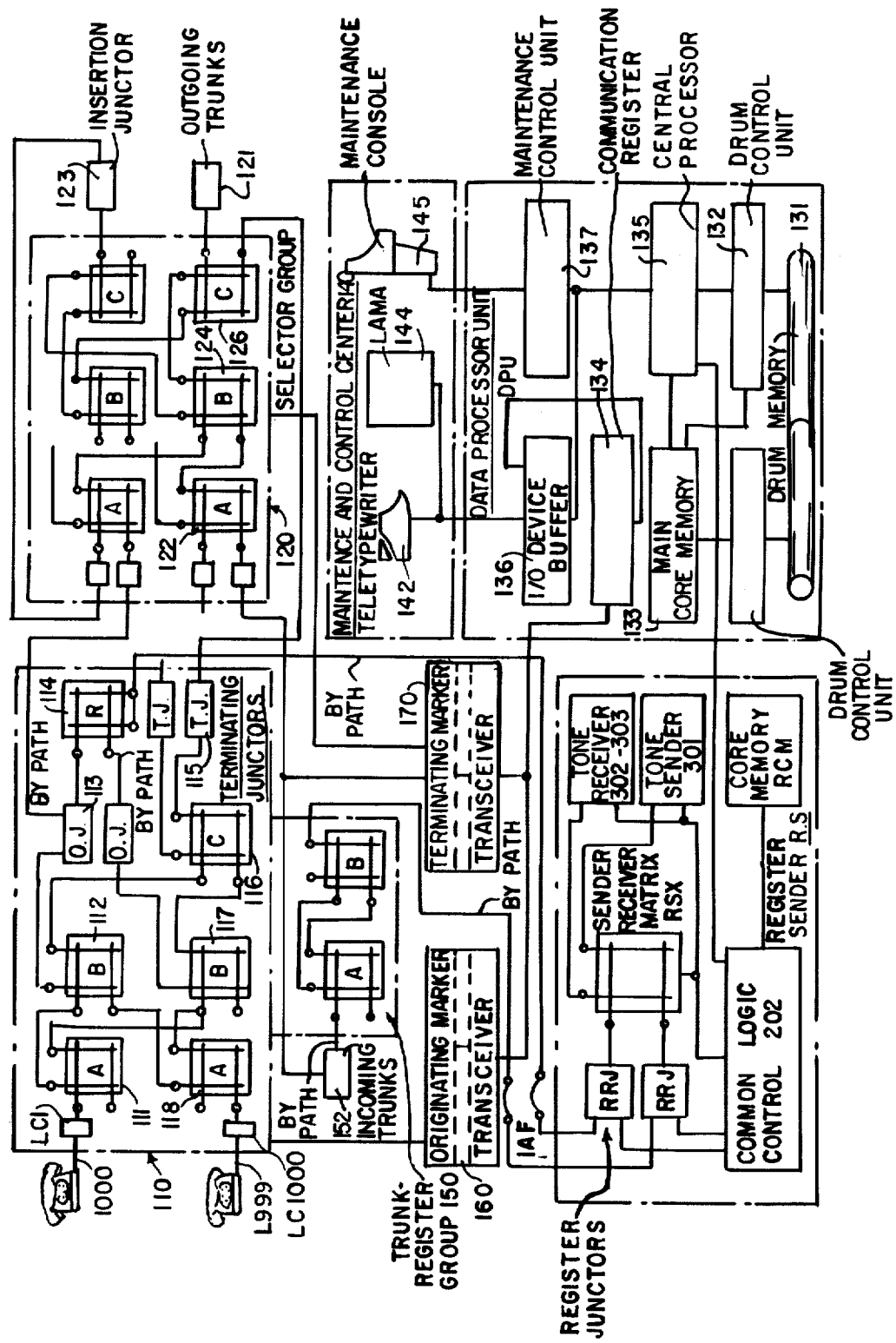
FIG. 2 is a chart concerning the ticketing scanner unit scan sequence.

The data retrieval and loading arrangement in the preferred form of the present invention is embodied in a local automatic message accounting subsystem as shown in FIG. 1 of a stored-program electronic telephone switching system as shown in FIG. 2. The system employs a magnetic tape transport and is adapted to write and record ticketing information on magnetic tape so that the tape may then be physically taken to another location for processing by a computer (not shown) for billing purposes. In accordance with the present invention, all of the system programs are loaded into and retrieved from the system of FIG. 1A by means of the subsystem of FIG. 1, since it is able to both write and read magnetic tapes and to communicate with the system. A peripheral adapter of the system includes a status register responsive to directives or instructions stored in the system processor storage areas for controlling the various different modes of operation of the subsystem as hereinafter described in greater detail.

GENERAL SYSTEM DESCRIPTION

The telephone switching system is shown in FIG. 1A. The system is disclosed in said system patent application, and also in said REGISTER-SENDER MEMORY CONTROL patent application. The system comprises a switching portion comprising a plurality of line groups such as line group 110, a plurality of selector groups such as selector group 120, a plurality of trunk-register groups such as group 150, a plurality of originating markers, such as marker 160, and a plurality of terminating markers such as marker 170; and a control portion which includes register-sender groups such as the group RS, data processing unit DPU, and a maintenance control center 140. The line group 110 includes reed-relay switching network stages A, B, C and R for providing local lines L000–L999 with a means of accessing the system for originating calls and for providing a means of terminating calls destined for local customers. The trunk-register group 150 also includes reed-relay switching networks A and B to provide access for incoming trunks 152 to connect them to the registersender, the trunks also being connected to selector inlets. The selector group 120 forms an intermediate switch and may be considered the call distribution center of the system, which routes calls appearing on its inlets from line groups or from incoming trunks to appropriate destinations, such as local lines or outgoing trunks to other offices, by way of reed-relay switching stages A, B and C. Thus the line group 110, the trunk-register groups 150, and the selector group 120 form the switching network for this system and provide full-metallic paths through the office for signaling and transmission.

The originating marker 160 provides high-speed control of the switching network to connect calls entering the system to the register-sender 200. The terminating markers 170 control the switching networks of the selector group 120 for establishing connections therethrough; and if a call is to be terminated at a local customer's line in the office then the terminating marker sets up a connection through both the selector group 120 and the line group 110 to the local line.

The register-sender RS provides for receiving and storing of incoming digits and for outpulsing digits to distant offices, when required. Incoming digits in the dial pulse mode, in the form of dual tone (touch) calling multifrequency signals from local lines, or in the form of multifrequency signals from incoming trunks are accommodated by the registersender. A group of register junctors RRJ function as peripheral units as an interface between the switching network and the common logic circuits of the register-sender. The ferrite core memory RCM stores the digital information under the control of a common logic 202. Incoming digits may be supplied from the register junctors via a register receiver matrix RSX and tone receivers 302–303 to a common logic, or may be received in dial pulse mode directly from the register junctors. Digits may be outpulsed by dial pulse generators directly from a register junctor or multifrequency senders 301 which are selectively connected to the register junctors via the sender-receiver matrix RSX. The common logic control 202, and the core memory RCM form the register apparatus of the system, and provide a pool of registers for storing call processing information received via the register-junctors RRJ. The information is stored in the core memory RCM on a time-division multiplex sequential access basis, and the memory RCM can be accessed by other subsystems such as the data processor unit 130 on a random access basis.

The data processor unit DPU provides stored program computer control for processing calls through the system. Instructions provided by the unit DPU are utilized by the register RS and other subsystems for processing and routing of the call. The unit DPU includes a drum memory 131 for storing, among other information, the equipment number information for translation purposes. A pair of drum control units, such as the unit 132 cooperate with a main core memory 133 and control the drum 131. A central processor 135 accesses the register sender RS and communicates with the main core memory 133 to provide the computer control for processing calls through the system. A communication register 134 transfers information between the central processor and the originating markers 160 and terminating markers 170 via input/output device buffers 136, which, together with a maintenance control unit 137, transfer information to the central processor 137 from the communication register 134 and from the maintenance control center 140. The maintenance and control center 140 includes a teletypewriter 142 for communicating with the system, and a local automatic message accounting sub-system 145 for providing ticketing functions and program loading and dumping operations. A maintenance control 145 is used for maintaining the system.

The line group 110 in addition to the switching stages includes originating junctors 113 and terminating junctors 115. On an originating call the line group provides concentration from the line terminals to the originating junctor. Each originating junctor provides the split between calling and called parties while the call is being established, thereby providing a separate path for signaling. On a terminating call, the line group 110 provides expansion from the terminating junctors to the called line. The terminating junctors provide ringing control, battery feed, and line supervision for calling and called lines. An originating junctor is used for every call originating from a local line and remains in the connection for the duration of the call. The originating junctor extends the calling line signaling path to the register junctor RRJ of the register-sender RS, and at the same time provides a separate signaling path from the register-sender to the selector group 120 for outpulsing, when required. The originating junctor isolates the calling line until cut-through is effected, at which time the calling party is switched through to the selector group inlet. The originating junctor also provides line lock out. The terminating junctor is used for every call terminating on a local line and remains in the connection for the duration of the call.

The selector group 120 is the equipment group which provides intermediate mixing and distribution of the traffic from various incoming trunks and junctors on its inlets to various outgoing trunks and junctors on its outlets.

The markers used in the system are electronic units which control the selection of idle paths in the establishing of connections through the matrices, as explained more fully in said marker patent application. The originating marker 160 detects calls for service in the line and/or trunk register group 150, and controls the selection of idle paths and the establishment of connections through these groups. On line originated calls, the originating marker detects calls for service in the line matrix, controls path selection between the line and originating junctors and between originating junctors and register junctors. On incoming trunk calls the originating marker 160 detects calls for service in the incoming trunks connected to the trunk register group 150 and controls path selection between the incoming trunks 152 and register junctors RRJ.

The terminating marker 170 controls the selection of idle paths in the establishing of connections for terminating calls. The terminating marker 170 closes a matrix access circuit which connects the terminating marker to the selector group 120 containing a call-for-service, and if the call is terminated in a local line, the terminating marker 170 closes another access circuit which in turn connects the marker to the line group 120. The marker connects an inlet of the selector group to an idle junctor or trunk circuit. If the call is to an idle line the terminating marker selects an idle terminating junctor and connects it to a line group inlet, as well as connecting it to a selector group inlet. For this purpose the appropriate idle junctor is selected and a path through the line group 110 and the selector group 120 is established.

The data processor unit 130 is the central coordinating unit and communication hub for the system. It is in essence a general purpose computer with special input-output and maintenance features which enable it to process data. The data processing unit includes control of: the originating process communication (receipt of line identity, etc.), the translation operation, route selection, and the terminating process communication. The translation operation includes: class-of-service look-up, inlet-to-directory number translation, matrix outlet-to-matrix inlet translation, code translation and certain special feature translations.

LOCAL AUTOMATIC MESSAGE ACCOUNTING SUB-SYSTEM

This section describes the local automatic message account LAMA toll ticketing subsystem 145 used with the system. In addition, this section briefly describes the associated software used to operate the hardware circuits. A description of the magnetic tape recording of automatic toll ticketing ATT data is also included. The essential functions of the toll ticketing subsystem are to collect, format, and record toll utilization data for future processing. The data gathered and reported is used for customer billing, toll separation, traffic engineering studies, planning and evaluation of toll services, and maintenance of toll facilities.

Equipment Capabilities

The toll ticketing equipment is intended for operation in a class 5 office for local automatic message accounting LAMA. The ticketing equipment tickets only customer-dialed automatic number identification ANI traffic. This customer-dialed ANI traffic may be either direct distance dialed DDD toll traffic or message rate service MRS local traffic. Extended direct distance dialed EDDD traffic is routed to a traffic service position system TSPS or a centralized automatic message accounting system CAMA, and is not processed by the LAMA toll ticketing subsystem. The LAMA ticketer tickets only calls originating within the local office. All DDD calls are ticketed on the outgoing trunk. All MRS calls are ticketed on originating junctors or incoming trunks serving high usage lines, such as PABX lines.

DDD Traffic

Direct distance dialing DDD traffic is ticketed as a timed call. The toll ticketing equipment supervises the call for both answer and disconnect times so that total conversation time can eventually be determined. The final determination of total conversation time is done at the accounting center. DDD traffic is restricted to station-to-station sent paid SSPD calls and to multi-message unit MMU calls. An SSPD call is a non-coin station pair call to a point outside of the customer's "expanded local area calling service" ELACS plan. A MMU call is a non-coin station paid call to a point outside of the customer's flat rate "normal area" zone, but within the boundaries of his ELACS plan.

MRS Traffic

Message rate service traffic is ticketed as pegged calls. The toll ticketing equipment supervises the call for the answer state only. That is, information is collected only as required to determine that a completed call took place and not to determine the total conversation time.

Permanent Truck Fault Detection

The toll ticketing equipment is capable of detecting permanent trunk fault conditions of the type which:
a. prevent the trunk from returning answer supervision to the ticketer (permanent unanswered state), or
b. prevent the trunk from removing answer supervision to the ticketer (permanent answer state).

Office Administration Data

In addition to the recording of call data for billing purposes, the toll ticketing equipment also is capable of recording call data for certain preselected office administration functions, including traffic sampling studies, traffic service observation studies, and maintenance information. The data recorded for office administration purposes may differ in content, or may require different interpretation than the data recorded for billing purposes.

Traffic sampling refers to the constant supervision of certain types of calls such that a preselected percentage of these calls are ticketed. The purpose of traffic sampling normally is to collect data for division of revenue studies. The toll ticketing equipment provides for traffic sampling of the following:

a. 100 percent of all completed outgoing INWATS calls,
b. 20 percent of all completed outgoing switch service network SSN calls, and
c. 10 percent of all completed outgoing flat rate WATS calls.

Traffic observation is the temporary supervision of certain trunk groups to determine, during specified intervals of time, the usage of these trunks. The instruction to initiate a selected traffic service observation enters into the system via the office administration teletypewriter. The ticketing operation continues until a subsequent input instruction, via the teletypewriter, terminates the study. When a trunk group is marked for study, all calls via that trunk group are ticketed completed and non-completed, billed and non-billed. The call records of non-completed and non-billed calls are marked with a special coded information character for easy identification.

Hardware Configuration and Functional Description

The toll ticketing equipment is a hybrid subsystem consisting of hardware physical equipment and software programs. This section describes the hardware. FIG. 1 shows the major hardware units associated with the toll ticketing subsystem. The toll ticketing subsystem consists of two basic equipment units called the automatic toll ticketing frame ATTF and the automatic toll ticketing relay frame ATRF. A subsystem configuration consists of one ATTF and either one or two ATRF's.

Automatic Toll Ticketing Relay Frame ATRF

The ATRF is a single-frame unit containing the scan point devices monitored by the ticketing scanner. A scan point device consists of a 1A correed. The coil of the correed is wired to the incoming trunk or originating junctor being monitored. The contact of the correed is monitored by the scanner. The ATRF serves 2,880 scan points. A fully expanded LAMA subsystem includes two ATRF's, or 5,760 scan points. Each ticketed outgoing trunk requires two scan points. All DDD calls are ticketed on outgoing trunks. Each metered originating junctor or incoming trunk requires one scan point. All MRS calls are metered on originating junctors and incoming trunks.

Each ATRF consists of four equipment files. Each file contains 720 scan points (18 cards per file, 40 scan points per card). These 720 scan points can serve either 720 originating junctors or incoming trunks MRS scan points or 360 outgoing trunks DDD scanpoints. All scan points within a single file must be dedicated to either MRS or DDD Service. An ATRF can, therefore, be engineered for various combinations of scan points, as seen in Table 1.

Table 1.

| | Automatic Toll Ticketing Relay Frame-Scan Point File Configuration | | | |
|---|---|---|---|---|
| | MRS SERVICE | | DDD SERVICE | |
| COMBINA-TION NUMBER | No. of Files | No. of Metered Ckts. | No. of Files | No. of Ticketed Ckts. |
| 1 | 4 | 2880 | 0 | 0 |
| 2 | 3 | 2160 | 1 | 360 |
| 3 | 2 | 1440 | 2 | 720 |
| 4 | 1 | 720 | 3 | 1080 |
| 5 | 0 | 0 | 4 | 1440 |

Automatic Tool Ticketing Frame ATTF

The ATTF is a dual frame unit containing two magnetic tape transports, a dual channel ticketing scanner unit, and all the associated control electronics. FIG. 1 depicts the functional configuration of the ATTF. The major component parts of the ATTF are the TSU Ticketing Scanner Unit, the TMU Ticketing Magnetic Tape Unit, and the TDB Ticketing Device Buffer.

a. TDB-A: Ticketing Device Buffer Channel a. This buffer is always dedicated to TMU-A and TSU-A.

b. TDB-B: Ticketing Device Buffer Channel B. This buffer is always dedicated to TMU-B and TSU-B.

c. TMU-A: Ticketing Magnetic Tape Unit-Channel A.

d. TMU-B: Ticketing Magnetic Tape Unit-Channel B.

e. TSU-A/B: Ticketing Scanner Unit. The TSU serves both channel A and B. Its active elements are internally duplexed.

At any point in time, only one of the TMU/TSU channels is active. The other channel will be in the standby mode. If a fault is detected in the active channel, the system reconfigures under program control to the standby channel. Reconfiguration is manually initiated to facilitate the removal of a completed magnetic tape and the loading of a new reel of tape. This procedure also has the advantage of alternately exercising the TMU/TSU channels.

In normal operation, both TDB's are active. TMU-A is active in conjunction with TSU-B. Both TMU-B and TSU-A are in the standby mode. On alternate days, the subsystem can be reconfigured such that TMU-B and TSU-A are active, and TMU-A and TSU-B are standby. Under a fault condition in either one of the equipment channels, the entire toll ticketing operation can be handled by the other channel.

Ticketing Scanner Unit TSU

The ticketing scanner unit is a medium speed electronic scanner/multiplex device. Its function is to monitor the scan point switches located in the ATRF, whose purpose is to duplicate the call processing state of the trunks and originating junctors. The TSU functions under address control by the computer central processor CCP. Each scan address retrieves the status of 24 scan points. Up to 120 scan addresses can be applied to a theoretical maximum of 1,440 ticketed outgoing trunks. The remaining 120 scan addresses can be applied to MRS metering. This allows for a theoretical maximum of 2,880 originating junctors and incoming trunks. In addition, 80 addresses are available for routining and fault localization.

FIG. 2 shows the TSU scan sequence. All DDD ticketed points are scanned at 300 millisecond intervals and all MRS metered points are scanned every 2.4 seconds. For ticketed DDD calls, the TSU monitors two normally open contacts H and A associated with each outgoing trunk circuit that is accessible by DDD traffic. When both the H hold and A answer contacts are open, the trunk is in the idle state. When H is closed and A is open, the trunk is seized but not answered. When answer supervision is returned, both the H and A contacts are closed. See Table 2.

Table 2.

| Hold and Answer Contact Configuration. | | |
|---|---|---|
| TRUNK STATE | CONTACT | |
| | H (Hold) | A (Answer) |
| Trunk Idle | 0 | 0 |
| Trunk Seized | 1 | 0 |
| Trunk Received Answer Supervision | 1 | 1 |
| Calling Party Goes On-Hook (Invalid State) A contact is opened during next scan | 0 | 1 |

With one scan address, the TSU scans all A contacts of a group of 24 trunks. On the succeeding address, the H contacts of the same group of trunks are scanned. It takes a nominal 27 microseconds to execute one scan address. Hence, it takes 54 microseconds nominal to scan a trunk group consisting of 24 DDD trunks. For a metered MRS call, the TSU monitors a single normally open contact associated with each MRS originating junctor or incoming trunk. During the monitoring interval which starts at the time of cutthrough, a closed contact represents the return of answer supervision from the called party. With each scan address, 24 MRS circuits are monitored, representing a scan rate of 24 points per 27 microseconds.

Ticketing Magnetic Tape Unit TMU

The ticketing magnetic tape unit consists of the magnetic tape transport and its associated read/write electronics, data buffering, error detection, and tape drive control electronics. The transport used may be purchased from Cook Electric Co. of Chicago, Illinois, the unit designated Series 3300 modified digital magnetic tape transport. The transport write/read head assembly writes data on nine tracks in a continuous NRZI non return to zero-IBM mode at 800 characters per inch. The tape used is standard width half-inch computer tape.

A pictorial representation of the magnetic tape transport, series 3300 modified for the system ticketing operations is shown in FIG. 3.

Ticketing data is written in blocks of 15 calls/block. Total time required to write a block of 15 calls is nominally 353 milliseconds. A read after write check for vertical and longitudinal parity is performed on each block. If an error is detected, the tape is advanced 3.75 inches and the block is re-written.

Call data is written in the "single entry" format; i.e., all the data pertaining to an individual call is formatted together in one single entry on the tape. The data transfer rate is 4,000 tape characters per second using the EBCDIC extended binary coded decimal interchange code magnetic tape code.

Ticketing Device Buffer TDB

The ticketing device buffer provides the I/O interface to the computer complex. It is equipped in duplicate, each unit serving one scanner and one magnetic tape channel. In normal active operation, one TDB is used to service the I/O operation to the scanner and the other TDB services the magnetic tape unit. The role is switched on alternate days. Under a fault condition, one TDB could service both a scanner and a magnetic tape unit sequentially, with the magnetic tape unit having the highest priority.

Software Description — Program Modules

Figure 4:
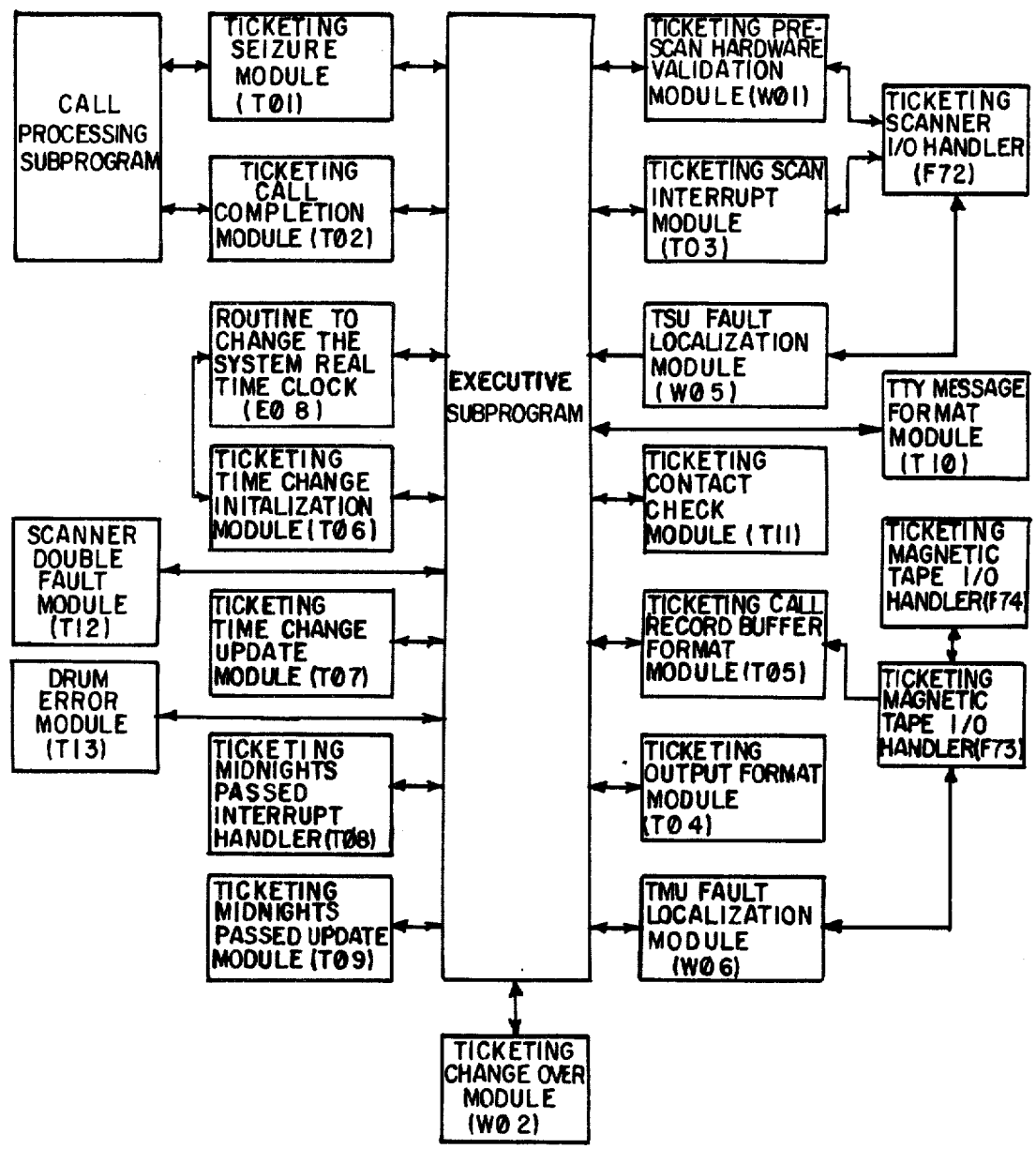
FIG. 4 is a block diagram of the various different programs used in connection with the subsystem of FIG. 1.

Refer to FIG. 4 for the major software program modules associated with the toll ticketing subsystem.

In the seizure module T01, the seizure routine is associated with the initial seizure of a ticketed trunk or originating junctor message rate service call. When the seizure routine receives an indication from the call processing program that a particular trunk or junctor is seized for the processing of a new call, the seizure routine checks to determine whether the previous call using that trunk or junctor has been completed. The seizure routine is responsible for detecting incomplete calls and assuring that the trunk or originating junctor is not scanned by the ticketing scanner unit until it has been determined that the new call is to be ticketed.

The basic function of the call completion modules T02 is to indicate that the trunk or originating junctor is to be scanned by the ticketing scanner unit. Information pertaining to the call is collected from the call history table, formatted, and written into a dedicated drum memory cell associated with the ticketed circuit.

In the scan interrupt module T03, the main purpose of the scan interrupt routine is to detect and record answer and disconnect time for calls. The scan interrupt routine is associated with the normal cycle of scan of all ticketed trunks and junctors. An interval timer, at 300-millisecond intervals, interrupts the central processor to initiate a scan routine. During each scan period, the program causes the ticketing scanner unit to successively interrogate the address and retrieve data for all trunks, together with a subgroup of the originating junctors. When answer is detected, the time is stored in the drum cell with the other information related to the call. When disconnect is detected, the data is read from the drum cell into a core main memory work area and the time of disconnect is added to the record.

The main purpose of the output format module T04 is to format the drum cell call information for magnetic tape output.

The call record buffer format module T05 is responsible for transferring the formatted call record data from a core memory work area to the call record buffer. The call record buffer holds a data block containing a maximum of 15 call records. When it is filled, the T05 module indicates to the magnetic tape I/O scheduler F73 that a data block is ready to be transferred to magnetic tape. This executive subprogram module schedules the outputting of the data block by the magnetic tape unit.

The time change initialization module T06 is responsible for recording the identity of all the outgoing trunk circuits on which a call was in progress during the time change. It also formats the time change data block as required for magnetic tape output.

The main function of the time change update module T07 is to update the drum cells associated with all trunk circuits on which a conversation was in progress during a time change. The update consists of setting an indicator specifying that the call was in progress during the time change. The update operation consists of a read-modify-write sequence.

The midnights passed interrupt handler T08 is responsible for recording the identity of all of the trunk circuits on which a conversation was in progress during a time change from one day-through midnight-to the next day.

The main function of the midnights passed update module T09 is to update the drum cells associated with all outgoing trunk circuits on which a conversation was in progress at midnight. The update consists of incrementing a counter in the cell by one if midnight occurred during a call. The update operation consists of a read-modify-write sequence.

The TTY message format module T10 is responsible for formatting all of the information required to be outputted on the TTY. This module formats three basic types of messages:
 a. Permanently closed contact identity.
 b. Permanently opened contact identity.
 c. Nine day duration of call.

The ticketing contact check module T11 performs basically two types of checks on the ticketing contacts (scan points): verify that the contacts are incapable of closing, and/or verify that the contacts are incapable of opening. The contact check module is scheduled at equal intervals of time, normally once per day. If it is determined that the contacts associated with a circuit trunk or originating junctor have never been opened or closed depending upon the check during the predetermined interval of time, a TTY message is initiated. This message contains the identity of the contacts that are faulty.

The scanner double fault, module T12 is scheduled whenever a double fault condition is detected in the TSU by the I/O handler module F72, indicating that both scanners are not working properly. T12 performs the necessary processing required to assure that no customers are improperly charged for calls due to this TSU malfunction.

The drum error module T13 is scheduled whenever a drum read or write is requested by the ticketing software and a drum error is encountered (read or write cannot be made). This module assures that the customer will not be improperly billed due to an error of this kind.

The ticketing algorithm module T14 consists of a set of algorithms which are used to access the ticketing tables. A program module can use T14 as a closed subroutine in order to locate a specific entry in the table. All the ticketing modules T prefix except T05, T06, T08, and T10 use the ticketing algorithm module to access these tables.

The ticketing scanner I/O handler F72 controls all communication between the ticketing scanner unit and the central processor for both normal operations and maintenance routines.

The magnetic tape I/O scheduler F73 schedules the outputting of data to the ticketing magnetic tape unit.

The magnetic tape I/O handler F74 controls all communication between the ticketing magnetic tape unit and the central processor for both normal operations and maintenance routines.

The pre-scan hardware validation module W01 is run prior to each 300-millisecond scan cycle. It essentially provides for an "abbreviated" routine of the ticketing scanner unit and the contact-diode matrix of the ATRF, to validate proper hardware operation.

The ticketing change over module W02 controls the step-by-step procedure required to perform a correct changeover from the "A" channel equipment to the "B" channel equipment and vice versa. The routine is initiated by a TTY request, normally for the purpose of changing a reel of magnetic tape.

The TSU fault localization, repair verification, and routining module W05 provides for the detailed routining and maintenance diagnostics of the ticketing scanner unit. It is run periodically at scheduled intervals and also when a fault is detected by the hardware error detectors.

The TMU fault localization, repair verification, and routining module W06 provides for the detailed routining and maintenance diagnostics of the ticketing magnetic tape unit. It is run at scheduled intervals and whenever a fault is detected by hardware error detectors.

Principal Tables

In the activity bit table, each ticketed circuit (incoming trunk or originating junctor) has an associated activity bit. The purpose of the activity bit is to indicate to the ticketing scanner unit that it should start scanning the associated point. The activity bit is set at the time of cut-through. For trunk circuits DDD calls, it is reset at the time of disconnect. For incomplete calls, it is reset at the time the trunk is re-seized for a new call. Refer to Tables 4 and 5.

Table 4.

Activity Charge Delay, and Previous Status States for a DDD Call.

| TRUNK STATES | SOFTWARE TABLE STATES | | | | | | | PROGRAM ACTION |
|---|---|---|---|---|---|---|---|---|
| | Activity Bit Table | Current Status | | Charge Delay Table | | | Previous Status Bit Table | |
| Outgoing Trunks | 1 Bit/Trk. | 2 Bits/Trk. | | 3 Bits/Trk. | | | 1 Bit/Trk. | |
| | | H | A | 3 | 2 | 1 | | |
| Idle | 0 | 0 | 0 | 0 | 0 | 0 | 0 | |
| Seizure (Prior to Cut-Through) | 0 | 1 | 0 | 0 | 0 | 0 | 0 | |
| Seizure (After Cut-Through) | 1 | 1 | 0 | 0 | 0 | 0 | 0 | Start contact scanning. Write call data in the drum cell. |
| Answer | 1 | 1 | 1 | 0 | 0 | 0 | 0 | Start charge delay timing. |
| | 1 | 1 | 1 | 0 | 0 | 1 | 0 | |
| | 1 | 1 | 1 | 0 | 1 | 0 | 0 | |
| Charge Delay Timing Interval | | | | | | | | Record answer time in drum cell. |
| | 1 | 1 | 1 | 1 | 1 | 1 | 0 | |
| | 1 | 1 | 1 | 0 | 0 | 0 | 1 | |
| Call Timing Interval (For Billing) | | | | | | | | |
| | 1 | 1 | 1 | 0 | 0 | 0 | 1 | |
| Disconnect (Called Party) | 1 | 1 | 0 | 0 | 0 | 0 | 1 | Record disconnect time and "set" the associated trunk bit in the DISCONNECT RECORDING TABLE. |
| Disconnect (Calling Party or Time Out) | 1 | 0 | 0 | 0 | 0 | 0 | 1 | Schedule the call record data to be read from the drum cell and formatted for eventual magnetic tape output. |
| Idle | 0 | 0 | 0 | 0 | 0 | 0 | 0 | Stop scanning the trunk and "reset" all tables associated with the call. |

Table 5.

Activity and Charge Delay Table States for a MRS Call.

| CIRCUIT STATES | SOFTWARE TABLE STATES | | | | | PROGRAM ACTION |
|---|---|---|---|---|---|---|
| (Originating Junctors and Incoming Trunks) | Activity Bit Table | Current Status | Charge Delay Table | | | |
| | 1 Bit/Circuit | 1 Bit/Circuit | 3 Bits/Circuit | | | |
| | | | 3 | 2 | 1 | |
| Idle or Seizure State (Prior to Cut-Through) | 0 | 0 | 0 | 0 | 0 | |
| Seizure State (After Cut-Through) | 1 | 0 | 0 | 0 | 0 | Write call record data in the drum cell. Start scanning. |
| Answer | 1 | 1 | 0 | 0 | 0 | Start charge delay timing. |
| Charge Delay Interval | 1 | 1 | 0 | 0 | 1 | |
| | 1 | 1 | 0 | 1 | 0 | Record answer time. Stop scanning (reset activity bit). Schedule other call record data to be read from the drum cell and formatted for eventual magnetic tape output. |
| Call in Progress (No Timing) | 0 | 1 | 0 | 0 | 0 | |
| | 0 | 1 | 0 | 0 | 0 | |
| Idle | 0 | 0 | 0 | 0 | 0 | |

In the previous status bit table, each ticketed trunk has an associated previous status bit not the originating junctors, however. A "1" in this bit position indicates that on the previous scan, the trunk was in the "true" answer state. A true answer means that the H and A contacts are both sensed as closed and this state has been maintained for a 2-second interval charge delay interval. A "0" indicates that on the previous scan, true answer supervision was not yet detected. Refer to Table 4.

The charge delay table is used to record the number of successive scans that the scanner has detected answer supervision (A and H contacts both closed) for a given trunk or originating junctor circuit. A three bit field is associated with each trunk and originating junctor. On each successive scan that answer is detected, the field is incremented by a count of one. When the field reaches a set value corresponding to the charge delay interval, a "true" answer condition is recorded. Refer to Tables 4 and 5.

The trunk disconnect recorded table contains one bit per ticketed trunk. A logic "0" in the bit position indicates that a disconnect time has not yet been recorded in the trunk call record cell on drum memory. A logic "1" in the bit position indicates that the time of disconnect is recorded in the trunk call record cell on drum memory. If the scanner detects that the called party returns on-hook (A contact restores), the time is recorded in the trunk call record cell (FIG. 5) and the associated bit is set (logic 1) in the trunk disconnect recorded table (possible disconnect). The trunk is still scanned until the calling party goes on-hook (H contact restores). In this case, the recorded disconnect time on drum is used for billing. However, if the called party returned off-hook assuming the calling party did not yet go on-hook and the conversation resumed, the bit in the trunk disconnect recorded table is reset (logic 0) and timing continues. The first recorded disconnect time is ignored and a new disconnect time will be recorded when either of the parties goes on-hook.

In the open and closed contact tables, each ticketed circuit trunk or originating junctor has an associated bit position in the ticketing open contact table and a corresponding bit position in the ticketing closed contact table. These tables are used with the ticketing contact check module to determine whether a permanent fault exists that prevents the circuit from properly returning answer supervision, i.e., contacts are permanently opened or permanently closed.

a. Closed contact table:
  "0" Indicates the contact was never detected open (always closed when scanned).
  "1" Indicates that an open contact condition was detected at least once during the monitoring interval normally one day.
b. Open contact table:
  "0" Indicates the contact was never detected closed (always open when scanned).
  "1" Indicates that a closed contact condition was detected at least once during the monitoring interval normally one day.

The circuit status table indicates which circuits are in service and available to the ticketing software for handling calls.

The trunk call record table (see FIG. 5) is located on drum memory. It consists of several individual trunk call record cells, one for each ticketed DDD call. Each cell consists of six words of memory and provides for temporary storage, throughout the duration of the call, of the calling and called number, answer time, and other call related information.

Figure 6:
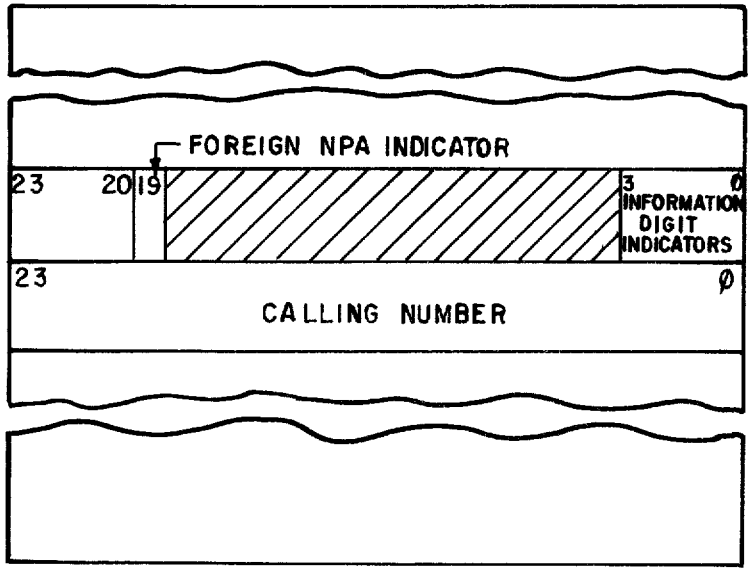

The originating junctor call record table is located on drum memory (see FIG. 6). It consists of several individual originating junctor call record cells one for each metered MRS call. Each cell consists of two words of memory and provides for temporary storage of the calling number and other call related information.

The circuit equipped table is used to specify whether a particular originating junctor or trunk circuit in the office section is equipped (the ticketing contacts are connected and the circuit "exists").

Information Flow and Control

The paragraphs that follow present a brief description of the information flow associated with a DDD call. The presentation is somewhat over-simplified, to facilitate a basic understanding of the programs utilized during a DDD call. Assume that a DDD call has to be ticketed. The system call processing program determines the identity of the trunk that was seized. At this point, the call processing program stores the identity of the seized trunk for this call, and transfers control to the ticketing seizure module.

The seizure module checks the activity bit table to assure that the associated trunk activity bit is reset to 0. This inhibits the scanner from looking at the trunk supervisory contacts during outpulsing. Control is then returned to the call processing program.

If the last call on this trunk was incomplete, the activity bit is still a 1 when checked by the seizure module. In this case, the seizure module resets the activity bit to 0 and schedules the recording of the incomplete call information on magnetic tape if traffic observation is being conducted.

Assuming a normal call, after cut-through register-sender outpulsing completed has occurred, the call processing program passes the equipment number of the trunk, the called number, and the calling number to the ticketing call completion module. The call completion module gathers this information, generates other information, and schedules the writing of this information in a table on the drum. The call completion routine then sets the activity bit causing the scan interrupt routine to begin interrogating the trunk for an answer condition. The call completion module returns control to the call processing program.

The scan interrupt module interrogates the trunk for an answer condition until an answer condition is found. When answer is first detected (both H and A contacts closed), the scan interrupt routine begins timing a 2-second charge delay interval. If the answer state remains for the 2-second interval, the time of answer is recorded and is scheduled to be written into the drum cell associated with this trunk.

The scan interrupt routine continues to interrogate the trunk looking for a disconnect condition. A disconnect condition is encountered when the called party disconnects and/or the calling party disconnects. If the calling party disconnects, the disconnect is defined as a true disconnect. If only the called party disconnects, the disconnect is defined as a false disconnect. Thus, the calling party controls the actual disconnection of the line. Let's take the case of a false disconnect. When this condition is detected A contact has restored, the disconnect time is stored on the drum and the associated trunk bit is set in the trunk disconnect recorded table. If the H contact is still operated, indicating that the calling party is still off-hook, the scanner continues monitoring the trunk. If the A contact reoperates (called party returns off-hook) before the H contact restores due to either a time-out or the calling party going on-hook, the trunk bit in the disconnect recorded table is reset. This nullifies the disconnect time previously recorded. The scanner always continues its supervision until both the H and A contacts have restored, indicating a true disconnect. After a true disconnect is encountered, a request is then generated to move the information associated with the trunk from the drum cell to a buffer work area in the computer core main memory. The scan interrupt module also requests the scheduling of the output format module after the information has been read off of the drum. After this call has been terminated, the scan interrupt routine stops scanning the trunk.

When the output format module begins execution, it formats all of the information concerned with the DDD call. The call record buffer format module is then scheduled. This routine places the formatted information in a call record buffer. When the buffer is filled (data from 15 calls), the call record buffer module indicates to the magnetic tape I/O scheduler module to schedule the outputting of this data on magnetic tape.

The magnetic tape I/O handler performs the final data formatting and data transfers to magnetic tape by the ticketing magnetic tape unit.

Call Record Entry Description

General Output Data Information

The output of the toll ticketing subsystem is the magnetic tape recording. The primary purpose of the magnetic tape recording is to provide a temporary record of individual toll call data for future processing and customer billing. Automatic toll ticketing ATT data also is recorded for nonbilling purposes such as division of revenues and toll traffic studies. Provisions are also made for the recording of non-ATT data, such as statistical traffic data and maintenance data, on the same tape. This non-billing data tape is interspersed with billing data record blocks.

The format and general content of the call record entry provides for the following:

a. An effective and efficient means of sorting data according to type and end purpose.

b. Standardization of the recording format so as to be compatible with TSPS.

c. Compatibility with the nine-track NRZI recording format requirements of the IBM 2400-series magnetic tape units.

d. EBCDIC code compatability (refer to FIG. 7). The heavily outlined portions of the chart of FIG. 7 identify those code combinations used to record billing data and associated tape labels. All standard alpha and graphic characters shown may be used for recording non-billing data on the magnetic tape.

Magnetic Tape Configuration

The magnetic tape used is half-inch wide, heavy-duty type, designed for computer use. Standard tape reels are 10.5 inches in diameter accommodating 2,400 feet of tape, and 8.5 inches in diameter handling 1,200 feet of tape. The tape has a "beginning of tape" reflector marker called a BOT MARKER (see FIG. 8) located about 10 feet from the outer end of the tape, indicating the useful beginning of the tape reel. Similarly, and "end of tape" EOT marker is located about 14 feet from the inner end of the tape, to indicate the end of the useful tape area. Approximately 9 feet of tape is required for each 1,000 calls ticketed.

Three types of gaps are used on the tape: initial gap, inter-block gap IBG, and tape mark gap. The gap following the BOT marker is called the initial gap and is approximately 3.75 inches in length. The inter-block gap is a gap between blocks of recorded data, and is nominally 0.6 inches in length. The tape mark gap refers to the gap proceeding the tape mark character and is approximately 3.75 inches long.

Figure 7:
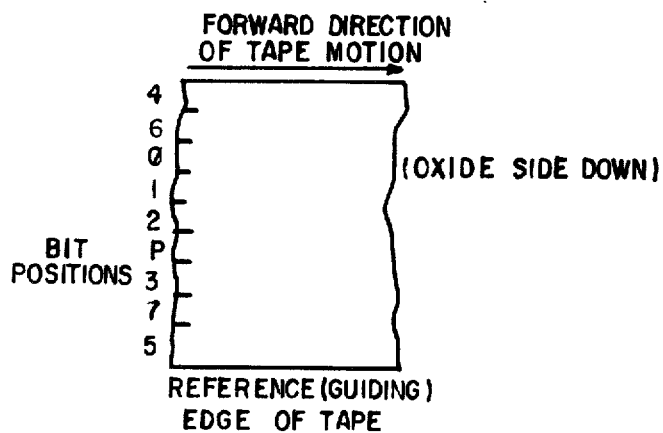
Figure 10B:
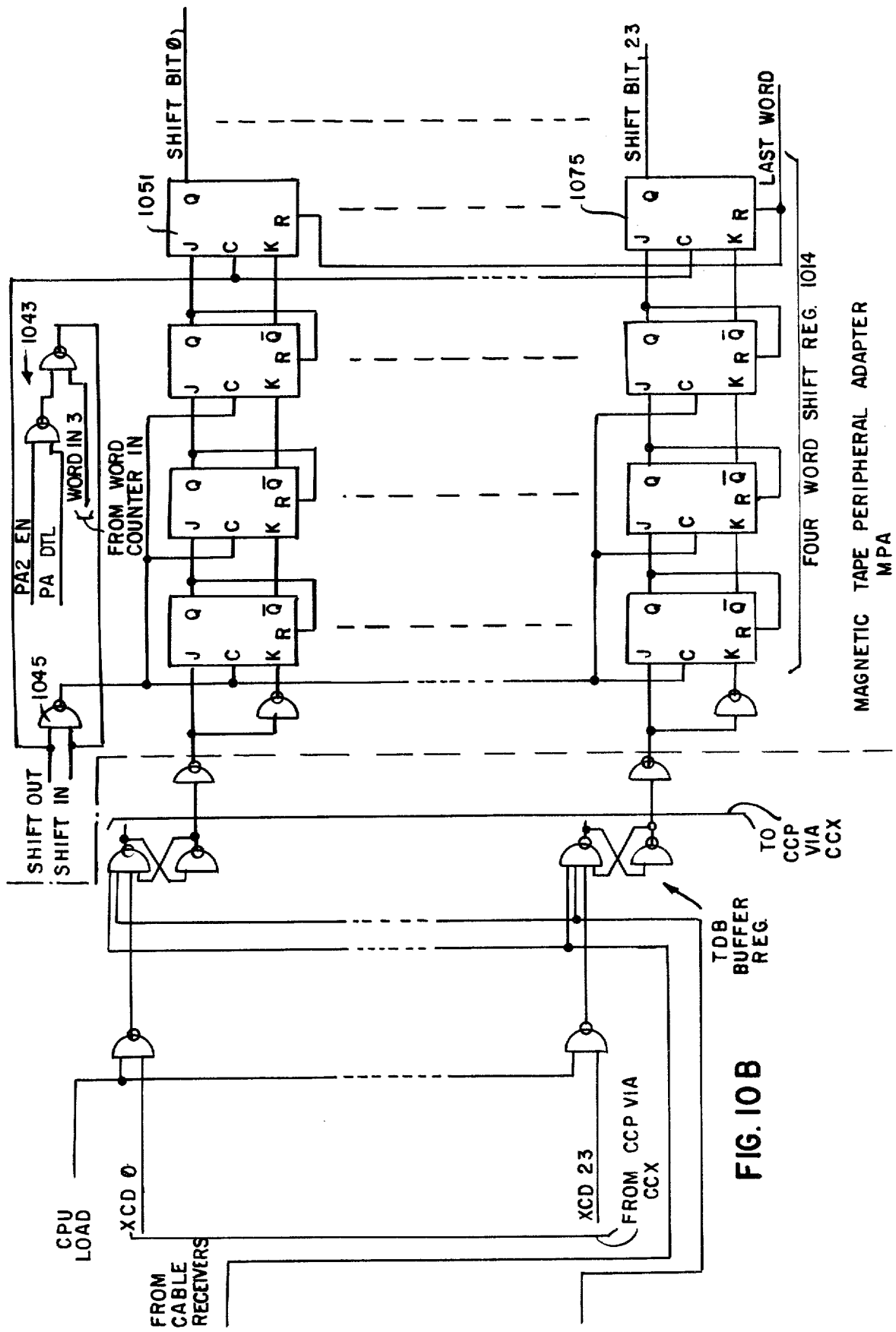
Figure 10C:
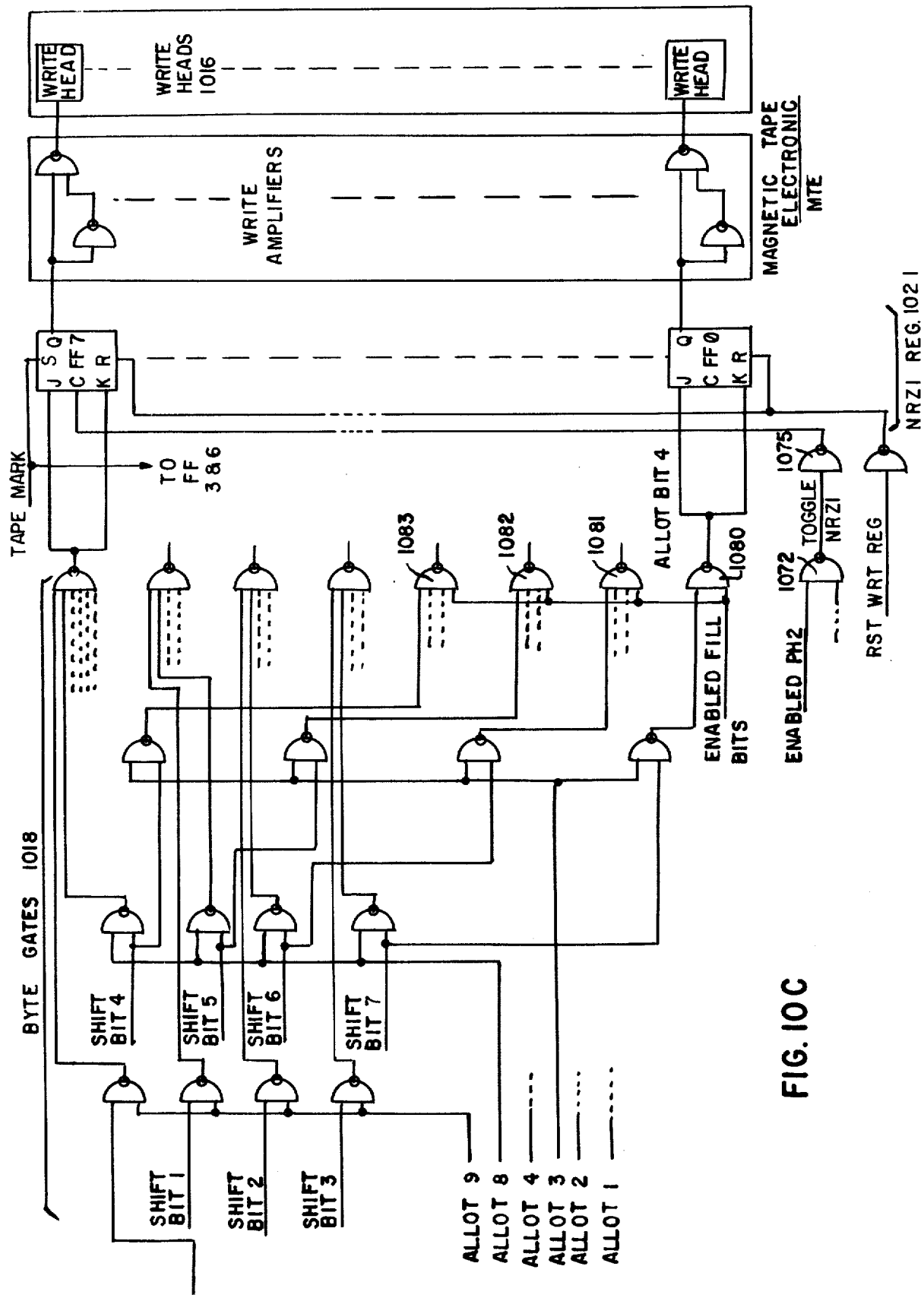

There are many information characters used for recording data on the magnetic tape. Refer to FIGS. 7, 8 and 9 when reading the following paragraphs. Brief descriptions of the major information characters are as follows:

a. Numeric characters. All numeric characters used are the standard IBM interchange code characters for nine channel magnetic tape recording.

b. Alphabetic characters. These characters are only used for the recording of non-billing data records. The alphabetic characters used are the standard "extended binary coded decimal interchange code" EBCDIC characters for nine track recording.

c. Graphic characters. As in the case of the alphabetic characters, these characters are only used when recording non-billing data. All the standard EBCDIC graphic characters are available for recording of this data.

d. Blank character.
  1. The blank character fills in fields in the standard format which are not applicable to the specified record. For example, the called number identification field, the disconnect time field, etc., are not applicable to a MRS call record and, therefore, are filled in with blank characters.
  2. The blank character is also used to fill out word lengths. The system uses a 24-bit word which is comprised of six binary coded decimal characters (six four-bit bytes). If an output word includes only five BCD characters, the missing byte position is filled in with a blank character.

FIG. 9 illustrates the conversion of the four bit/byte structure of the CPU code to the eight bit/byte structure of the magnetic tape code (the parity bit is the ninth bit). The magnetic tape peripheral adapter circuit fills out the word with 1's to make the four bit byte of BCD an eight bit byte of EBCDIC.

e. Repeat block character.
  1. The tape transport circuitry provides read checking for both vertical and longitudinal parity. If a parity error or any other error is detected during the read operation, the tape is advanced 3.75 inches and the data block is re-recorded.
  2. The 8th byte position of each data block is called the repeat block character. This byte indicates, by being in the 0 or 1 logic state, whether the data is an original recording or a repeat of the previous block: A 0 indicates that the block is an initial recording of the data. If the block has to be rewritten due to an error, the repeat block character is set to 1.

f. Tape mark character. The function of the tape mark character is as an end of file indicator. It is used in combination with the trailer label and the tape mark gap as an indication to the accounting department that no further records are recorded on the tape. (See FIGS. 8 and 9)

g. Null character. The function of the null character is to fill a time slot vacated due to the fact that valid data was not received in time to be recorded on the tape. Null characters are recorded in the time slots in place of the data until the request is acknowledged by the computer central processor.

h. Data block entry identifier characters. The first three characters of each data block entry identifies the entry type, i.e., header label, trailer label, billing data, metering data, etc. Each data block entry identification code consists of a unique combination of the special entry characters as shown in FIG. 9 and Table 6.

Table 6

| Data Block Entry Identification Code. | |
|---|---|
| ENTRY IDENTIFIER | ENTRY DESCRIPTION |
| a a a | Header Label |
| a a B | Transfer Label |
| a B a | Time Change Data Block |
| a B B | Trailer Label |
| B a a | Test Message Data Block |
| B a B | Billing Data Block |
| B B a | Traffic Metering Data Block |
| B B B | Not Assigned | i. Vertical redundancy check character VRC. The P track on the magnetic tape contains this VRC parity check character. The parity bit recorded on the P track is set when even parity is observed for bits 0–7 of each tape character (see FIGS. 7 and 9). Odd parity is the correct mode (good parity) covering the nine bits of each tape character.

j. Longitudinal redundancy check character LRC. The longitudinal redundancy check is a parity check of all of the tracks recorded on the tape. As the tape is recorded, an odd or even indication of 1 bits in each track is determined for the complete data block. A check bit is written at the end of each track to make the total number of bits in each track even including the check bit. The combination of longitudinal check bits for the nine tracks make up the LRC character. See FIG. 8.

k. Cyclic redundancy check character CRC. The CRC character is used to allow correction of single track read errors. This character is written at the end of each data block directly before the LRC character. The ATT recording system always writes a dummy character in the CRC location. See FIG. 8

Magnetic Tape — Format

Information on the magnetic tape normally begins with a header label, followed by data blocks, and ending with a trailer label. The last entry on the tape is the tape mark character. The data blocks are primarily call records, fifteen call records to a block, but they could also be traffic metering data record blocks, time change data record blocks, etc.

Within any given data block, the data must be of the same type, and all data blocks of a given type will be of a fixed length. The basic tape organization of all recorded data blocks is shown in FIG. 8. The first eight bytes of any data block are comprised of: a three-digit identification code, a four-digit field defining the size of the block, and a one-digit repeat block character as hereinbefore described. The eight-byte "introductory field" is then followed by the main body of data to be recorded in the block. The block is concluded with two check characters. These characters are the CRC cyclic redundancy check and the LRC longitudinal redundancy check. The ATT subsystem does not generate the true CRC character, but writes a dummy character in its place for format compatibility.

Header and trailer labels are entered on the tape separately and are not part of the data block. These labels are 48 bytes in length. The header label is the first block of ticketing data recorded on the tape at the start of each day. Included within the header label is the "office type code" (the system) and the office identification code. The header label is recorded a minimum of 3.75 inches following the trailing edge of the BOT marker. See Table 7 for the label content and format.

Table 7.

| Label Content/Format (Header and Trailer) | |
|---|---|
| ENTRY | NO. OF BYTES |
| Label Identifier Code | 3 |
| Block Size | 4 |
| Repeat Block Character | 1 |
| Office Type Code | 1 |
| Tape Transport ID | 1 |
| Blank Character | 2 |
| Office Identification | 6 |
| Day | 2 |
| Month | 2 |
| Year | 2 |
| Hour | 2 |
| Minutes | 2 |
| Reel Count | 1 |
| Blank Character | 1 |
| Call Record Count | 6 |
| Block Count | 4 |
| Blank Character | 2 |
| Repeat Block Count | 4 |
| Blank Character | 2 |
| | 48 Total |

The trailer label is the last data block entered on the tape at the end of each days recording. It consists of the same information content as the header label, except for a different label identifier code. A tape mark is recorded approximately 3.75 inches after the last byte in the trailer label.

In the case of a tape unit failure, tape breakage, end-of-tape condition, teletype instruction or some other emergency which requires transferring to another TMU, a transfer label rather than a header label is recorded at the start of the new tape reel. Except when the nature of the fault condition prevents it, the transfer label is also entered at the end of the original tape in lieu of trailer label. With the exception of the label identifier character, the transfer label has the same information content and format as do the header and trailer labels.

Billing Data Block

The billing data block consists of 15 individual call records. A call record is a group of data pertaining to an individual call. The data is recorded in a prescribed sequence. For reference to the first three fields of a billing data block and the general entry format, see Tables 8 and 9, respectively.

Table 8

| Billing Data Block Format | |
|---|---|
| INFORMATION | NO. OF BYTES |
| Block Entry Identification Code | 3 |
| Block Size | 4 |
| Repeat Block Character | 1 |

Table 9.

| | Call Record - General Entry Format | |
|---|---|---|
| | INFORMATION | NO. OF BYTES |
| DATA GROUP A | Call Record Entry Code-identifies the type of call, i.e., Station Paid DDD, Message Rate, etc. | 3 |
| | Type of Subscriber Service Code-identifies special subscriber service, i.e., Coin, Call Transfer 3 Way Calling, etc. | 2 |
| | Information Code (special digits for data sorting) | 3 |
| | Calling No. (NPA code, office code, and terminal digits) | 10 |
| | Answer Time (hours, minutes, and seconds) | 6 |
| | Called No. (NPA code, office code, and terminal digits) | 10 |
| | Disconnect Time (hours, minutes, and seconds) | 6 |
| DATA GROUP B | Midnight Passed Digit - indicates whether the recorded answer time refers to the same day as the disconnect time or to some prior day. | 1 |
| | Equipment No. - The equipment identification number recorded is the scan point address of the associated trunk or originating junctor. | 6 |
| | Modifier Digit - allows for future expansion of the format (always zero for No. 1 EAX LAMA operation) | 1 |
| | | 48 TOTAL |

Call records for DDD calls, or any other timed calls such as measured WATS, record both data group A and B (Table 9). Message rate service MRS calls record only data group A.

Miscellaneous Data Blocks

In addition to the call record block, there are provisions for other data blocks, such as time change record blocks, traffic metering data record blocks, etc. The following paragraphs briefly describe these data blocks.

The time change record block is inserted into any tape which is in process during a change between daylight savings time and standard time, or when time must be corrected due to clock failure, power failure, etc. Refer to Table 10 for the data format of the time change record block.

Table 10.

| Time Change Record Block Format | |
|---|---|
| ENTRY | NO. OF BYTES |
| Entry Identification Code | 3 |
| Block Size | 4 |
| Repeat Block Character | 1 |
| Day | 2 |
| Month | 2 |
| Year | 2 |
| Hours (Before Change) | 2 |
| Minutes | 2 |
| Seconds | 2 |
| Day | 2 |
| Month | 2 |
| Year | 2 |
| Hours (After Change) | 2 |
| Minutes | 2 |
| Seconds | 2 |
| Blank Characters | 16 |
| | 48 TOTAL |

Table 11.

| LAMA Toll Ticketing Subsystem Designations | |
|---|---|
| NAME | MNEMONIC |
| Automatic Toll Ticketing Relays | ATR |
| Battery Driver Peripherals | BDP |
| Interframe Cabling A | CAA |
| Interframe Cabling B | CAB |
| Cores | COR |
| Magnetic Tape Peripheral Adapter | MPA |
| Magnetic Tape (Read/Write) Electronics | MTE |
| Network Cabling A | NCA |
| Network Cabling B | NCB |
| Ring Core Scanner | RCS |

Table 11.-continued

LAMA Toll Ticketing Subsystem Designations

| NAME | MNEMONIC |
| --- | --- |
| Scanner Peripheral Adapter | SPA |
| Ticketing Device Buffer | TDB |
| Ticketing Magnetic Tape Unit | TMU |
| Ticketing Scanner Unit | TSU |
| Automatic Ticketing Relay Frame | ATRF |
| Automatic Toll Ticketing Frame Assembly | ATTF |

LOCAL AUTOMATIC TOLL TICKETING SUBSYSTEM

Referring now to the drawings and more particularly to FIG. 1 thereof, there is shown the local automatic toll ticketing subsystem of the present invention. The essential function of the toll ticketing subsystem is to collect, format, and record data for future processing. The subsystem makes maximum use of the system common control and relevant information generated by other subsystems.

The ticketing subsystem provides:

a. Software - which collects and formats data.

b. Scanner - which senses the call start and finish times.

c. Magnetic Tape - the output recording medium.

Provision is also made to use the magnetic tape as an input device.

The software functions include the following operational routines:

1. Seizure Routine—This routine checks for the expected condition of trunk or junctor on seizure.
2. Completion Routine—This routine controls ticketing on trunks and OJ junctors; it determines which TRK/OJ's to ticket.
3. Scan Interrupt Routine—This routine periodically initiates scanning of trunks and junctors to detect an answer or disconnect. Upon an answer it writes the answer time to appropriate drum call. Upon a disconnect, it stores the disconnect time and drum cell data in the work area, and schedules the format routine.
4. Output Format Routine—This routine formats data for magnetic tape requirements; it also schedules magnetic tape routine.
5. Magnetic Tape Routine—This routine collects call data and locates it in one of two, 15 call, buffers. When the buffer is full, the routine controls the data transfer to magnetic tape.
6. Time Change Routine—This routine indicates which calls were in progress during a time change.
7. Midnight Passed Routine—This routine indicates that answer and disconnect times are for different days.

The following is a list of the maintenance routines:

1. Reconfiguration Operation—This program organizes a working subsystem under fault conditions.
2. Routining, Localization and Verification Operation—This operation activates the hardware system and provides a printout of errors. There are three modules, one for each hardware unit.
3. Sneak Path Check (Hardware Validation) Operation—This operation checks the scanning contact isolation diodes.
4. Ticketing Circuits Check—This program checks for permanent answer and permanent non-answer conditions.

The functional hardware configuration of the LAMA subsystem is shown in FIG. 1 and includes the following circuit arrangements:

1. Ticketing Device Buffer TDB

This buffer provides the I/O interface for scanner and magnetic tape units. All subsystem interrupts and all data and instructions are routed via this buffer, since there is only one error interrupt and one ready interrupt associated with the buffer. The buffer data channel consists of 24 bits and a parity, the parity being checked or generated according to direction of transmission. One of N checking is performed on SEL instructions and certain PA interface leads. There is a full word of status bits accessible by a SEL instruction.

2. Ticketing Scanner and Associated Peripheral Adapter TSU

The scanner interrogates contacts associated with supervisory circuits (originating junctors, outgoing trunks, incoming trunks). It consists of a three dimensional scanning matrix with interrogation groups of 24 contacts. For each address received battery driver and ground switch data on 24 contacts is retrieved through ferrite core sense rings. The scanner operation is controlled by the scanner peripheral adapter SPA. A one of N check is provided on instruction decode and a full word of status bits is accessible by a SEL instruction 1 0 0. The hardware and software arrangements allow for limited growability.

4. Automatic Ticketing Repeating Relay Frame ATRF

The slave relays provide contact isolation from the ticketed TRK/OJ circuits required for scanning purposes. Complete flexibility is available via a distribution frame which enables any supervisory circuit to be scanned.

5. Magnetic Tape and Associated Peripheral Adapter TMU

The peripheral adapter receives data in four word groups 24 bits/word from the central processor unit CPU. It transfers the data in blocks (up to 800 bytes, nine bits per byte) to the transport under conditions of IBM compatibility. A read after write check is made on vertical and longitudinal parity. The unit is capable of reading pre-written tapes and sending the data to the unit CPU. There is a full word of status bits accessible by a SEL instruction.

The tape transport has a tape speed of 5 ips with a density of 800 bpi on a nine track system. It uses ½ inch tape and operates in the continuous mode.

Configuration

In the normal configuration (no fault) buffers TDB are not shared. The configurations are:

|    | | |
| --- | --- | --- |
|    | magnetic tape | Channel A |
|    | scanner | Channel B |
| or | | |
|    | magnetic tape | Channel B |
|    | scanner | Channel A |

These two configurations alternate on, for example, a 24 hour basis. The actual time is dictated by the tape unloading.

In a fault situation, live data is handled by either channel A or channel B depending on the location of the fault. The buffer TDB is shared between the two peripherals. This leaves the other channel for localization, repair and verification. A channel is synonomous with a frame thus achieving power supply isolation for card removal purposes.

Under these conditions the magnetic tape has a higher priority than the scanner with regard to the buffer TDB. The magnetic tape retains sole use of the buffer while producing a data block (i.e., scanning takes place between writing data blocks).

Ticketing Device Buffer TDB

This circuit is identical to the computer device buffer CDB.

The buffer TDB provides a common interface with the computer multiplex CCX for serving one of four peripheral units at a time. It provides intermediate reception and storage of instruction and data from the unit CPU to the peripheral unit. For communication from the peripheral unit to the unit CPU the same storage is used for data and two interrupts (ready and error) are provided. It has checking facilities in the form of:

1. A parity check or generate on a computer word.
2. A 1 of N check on instructions and PA control.

Select instructions provide control over on or off line and enable the status word to be retrieved by the unit CPU. A clear instruction is available which is also used to clear the peripheral units.

The unit MPA makes use of both the instruction and data storage in the buffer TDB rather than duplicating these functions. The buffer TDB interfaces directly with:

1. the unit SPA, via 64 leads made up of the following:
   24 Data In leads identified as BFR BT0 to BFT to BT23
   24 Data Out leads identified as PA 1 INPUT BIT 0 to PA1 INPUT BIT 23
   8 Directive leads identified as DIRECTIVE 0 (1A) to DIRECTIVE 7 (1A)
   8 Control leads marked:
       PA DTL 1A
       PA CLEAR 1A
       PA 1 EN
       RST ACKN 1A
       PA1 LOAD DEV
       PA1 SET READY
       PA 1 ACKN
       PA1 DEVICE ERR
2. the unit MPA, via 68 leads is made up of the following:
   24 Data In leads identified as BFR BT0 to BFR BT 23
   24 Data Out leads identified as PA2 INPUT BIT 0 to PA2 INPUT BIT 23
   8 Directive leads identified as DIRECTIVE 0 1A to DIRECTIVE 7 1A
   2 Directive Extension leads marked DIR EXT 1 to DIR EXT 2
   10 Control leads marked:
       PA DTL 1A
       PA CLEAR 1A
       PA 2 EN
       RST ACKN 1A
       RST PA ERR 1A
       PA2 LOAD DEV
       PA2 SET READY
       PA2 ACKN
       PA2 DEVICE ERR
       RST DTL
3. The unit CCX, via two cable cards containing 61 leads made up of the following:
   24 Data In leads identified as XCD0 to SCD 23
   1 Data In parity identified as XCD24
   24 Data Out leads identified as XCB0 to XCB23
   1 Data Out parity identified as XCB24
   11 Control leads identified as:
       —XCRDY SENSE
       —XCRDY INTR
       —XCERR INTR
       —XCON LINE
       —XCDISC STRB
       —XCVRY STRB
       —XCDST
       —XCAST
       —XCSS2
       —ticket scanner off line
       —ticket magnetic tape off line Magnetic Tape Peripheral Adapter MPA All the circuitry takes the form of SUHL logic; its purpose is to interpret instructions received from the unit CPU via the buffer TDB into a sequence of events which performs the required function. The data words are reorganized into characters (bytes), for output to the write amplifiers in the unit MTE which feed the write heads on the transport. The unit receives data from the read deskew register in the unit MTE and performs the read after write parity checks, and transfers data back to the unit CPU via the buffer TDB. The unit MPA is reset at the beginning of each operation.

These functions are performed using the following:
1. An instruction decode and sequencing control.
2. A status register - this unit stores operating mode and error indicators.
3. A data storage buffer (4 word shift register) — to reduce unit CPU real time required by the unit and provide time for the unit CPU to service the unit.
4. Byte gates — to restructure words into tape bytes either 3 or 6 bytes per word.
5. A parity generator for tape bytes.
6. A write register NRZ1 (non return to zero).
7. A parity check for tape bytes.
8. A longitudinal parity check register.
9. A data multiplexer — to enable different data groups to be returned to the unit CPU.

The unit MPA interfaces with:
1. The buffer TDB, via 68 leads as explained previously.
2. The unit MTE, via 49 leads made up of:
   24 input leads identified as:
       READ BIT 0 to READ BIT 7 and READ BIT PAR READ CLOCK, GATE PULSE, CLOCK 4, PH1, PH2 BOT OUTPUT 4, EOT OUTPUT 4, FILE PROT PRES, TRANSPORT READY, SPD DLY 1, UNIV DLY 1, DISABLE CLK UP to SPEED, CLK WORD IN
   24 output leads marked:
       WRITE BIT 0 to WRITE BIT 7 and WRITE BIT PAR -WRITE BIT 0 to -WRITE BIT 7 and -WRITE BIT PAR ST RUN UP TIMER, INHIBITE RD CLOCK, START UNIV DLY ENAB WRITE, STAT BIT 0, STAT BIT 3, GEN RST, -DTL

Magnetic Tape Electronics MTE

This circuit provides the timing and the necessary discrete component and analogue interface between the unit MPA and the magnetic tape transport. It contains three types of hardware - unit HTL, Discrete and Relay.

The functions provided are:

Write Amplifiers—these supply write current to the heads.

Erase Amplifier—this supplies current to erase the head.

Write Clock—this provides timing to achieve the correct packing on tape.

Read Clock—this derives timing from the read head output.

Read Amplifiers—these provide analogue to digital conversion of read head output.

Read Deskew Register—this is a 9 bit register that accumulates bits as they are read.

End of Tape EOT and Beginning of Tape BOT amplifiers—these derive a digital output from the amplifier EOT/BOT contacts.

Timers—these bring the tape up to speed, inhibit one read clock at the amplifier BOT, and provide tape spacing to meet IBM requirements.

Transport controls and monitors—these provide remote operating controls and status monitors.

The unit MTE interfaces with:
1. The unit MPA via 50 leads as explained previously.
2. The tape transport via 57 leads made up of:
   26 input leads:
   READ HEAD OA - 7A and READ HEAD PA
   READ HEAD OB - 7B and READ HEAD PB
   EOT INPUT 1-3, BOT INPUT 1-3
   FILE PROTECT, READY
   24 output leads:
   WRITE HEAD OA - 7A and WRITE HEAD PA
   WRITE HEAD OB - 7B and WRITE HEAD PB
   ERASE 1-2,
   DRIVE ON/OFF
   DC COMMON, FP COMMON, RDY COMMON

Magnetic Tape Transport MTT

The transport must physically control the tape to meet IBM standards (series 2400). The major factors involved in meeting this requirement are:

1. Track tolerances — define for IBM standards the positions on the tape of each track relative to the guiding edge.
2. Cell tolerance — skew, (lateral displacement between bits in the byte) and speed tolerance must be such that cell tolerances are met; cell compression or expansion will cause bits to be gained or lost respectively.
3. Start and stop distances — these must be compatible with the IBM inter block gap requirement.

The unit can be divided into four functions:

1. Tape Drive System — this controls movement of tape across the heads.
2. Reel Drive System — this controls tape feed and take up, and provides fast wind capability.
3. Magnetic Head Subassembly — this contains read, write and erase heads, unit EOT and unit BOT sensors and a tape cleaner.
4. Control Subsystem — this provides for local or remote control, all relevant controls are made mutually exclusive.

Transport Characteristics:

| | |
|---|---|
| Mode of operation | Continuous |
| Reels | 10 ½" containing 2400 feet. |
| Tape | ½" |
| No. of tracks | 9, 8 data plus one parity |
| Character Density | 800 bytes per inch |
| Speed | forward 5 inches per second; fast forward 180 inches per second. Rewind 180 inches per second. |
| Checking | a read head provides the means for read after write check. |

The transport interfaces with the unit MTE via 57 leads as explained previously.

Operation

There are two PA adapters served by each buffer TDB, the unit MPA is designated number 2; thus the X field using 2 indicates that the instruction is intended for the unit MPA. All leads between the buffer TDB and unit MPA which are unique are identified by the number 2 e.g., PA2 EN. The Z field (Directives 0–7), in conjunction with the Y field (Directive Extension 0 and 1) provide the sixteen instructions.

The SEL instructions are listed in the following Table 1 and the status word is defined in the following Table 2:

Table 1

| CODE X Y Z | SELECT (SEL) INSTRUCTIONS INSTRUCTION | STATUS BITS AFFECTED | MODE INSTR. |
|---|---|---|---|
| 2 0 0 | LOAD MPA STATUS INTO TDB BUFFER | — | |
| 2 0 1 | CHECK SHIFT REGISTER | 5, 9 | X |
| 2 0 2 | CHECK WRITE REGISTER (6 BYTES/WORD) | 6, 8 | X |
| 2 0 3 | CHECK WRITE REGISTER (3 BYTES/WORD) | 6, 9 | X |
| 2 0 4 | ON-LINE | 0 | |
| 2 0 5 | OFF-LINE | 0 | |
| 2 0 6 | STOP - DISENGAGE DRIVE | 3 | |
| 2 0 7 | ACCEPT MORE DATA & CHECK PARITY | — | |
| 2 1 0 | ADVANCE TAPE | 7 | X |
| 2 1 1 | ACCEPT MORE DATA | — | |
| 2 1 2 | WRITE TAPE MARK | 11 | X |

Table 1-continued

| SELECT (SEL) INSTRUCTIONS | | | |
|---|---|---|---|
| CODE | INSTRUCTION | STATUS BITS AFFECTED | MODE INSTR. |
| 2 1 3 | READ ONLY | 10 | X |
| 2 1 4 | DATA BLOCK COMPLETE - READ BACK - CHECK LRC | 10, 12 | |
| 2 1 5 | OUTPUT DATA (6 BYTES/WORD) | 8, 13 | X |
| 2 1 6 | OUTPUT DATA (3 BYTES/WORD) | 9, 13 | X |
| 2 1 7 | DATA BLOCK COMPLETE | 12 | |

Table 2

| BIT | STATUS | STATUS REGISTER SEL. INSTR. | INPUTS | OTHERS |
|---|---|---|---|---|
| 0 | CAPSTAN MOTOR ON/OFF | 204, 205 | | — |
| 1 | TRANSPORT READY | — | | TRANSPORT VIA MTE |
| 2 | WRITE ENABLE (FILE PROTECT) | — | | TRANSPORT VIA MTE |
| 3 | DRIVE ENGAGED/DISENGAGED | 212, 213, 215 216, 206, 210 | | BLOCK TIME OUT |
| 4 | EOT SENSED/NOT SENSED | — | | TRANSPORT VIA MTE |
| 5 | CHECK SHIFT REGISTER | 201 | | — |
| 6 | CHECK WRITE REGISTER | 202, 203 | | — |
| 7 | ADVANCE TAPE | 210 | | — |
| 8 | 6 BYTES/WORD | 202, 215 | | — |
| 9 | 3 BYTES/WORD | 201, 203, 216 | | — |
| 10 | READ MODE | 213, 214 | | — |
| 11 | WRITE TAPE MARK | 212 | | — |
| 12 | DATA BLOCK COMPLETE | 214, 217 | | — |
| 13 | OUTPUT DATA | 215, 216 | | — |
| 14 | EOT & BOT (NO TAPE) | — | | TRANSPORT VIA MTE |
| 15 | LRC WRITTEN | — | | CHARACTER TIMER |
| 16 | DATA AVAILABLE/NOT AVAILABLE | — | | WORD-IN COUNTER |
| 17 | Y FIELD 1 of N ERROR | — | | 1 of N CHECK |
| 18 | READ PULSE RECEIVED | — | | MTE READ CIRCUITRY |
| 19 | LRC READ | — | | CHARACTER TIMER |
| 20 | LRC OVERDUE | — | | CHARACTER TIMER |
| 21 | VERTICAL PARITY ERROR | — | | PARITY CHECK CIRCUIT |
| 22 | LONGITUDINAL PARITY ERROR | — | | LONGITUDINAL CHECK REGISTER |
| 23 | PA DEVICE ERR | — | | DEVICE ERR LATCH |

Considering now the receipt of SEL instructions, on receipt of a PA2 EN signal from the buffer TDB, the unit ACKN flip-flop is set, and a PA2 ACKN signal is returned to the buffer TDB. The buffer TDB sends a RST ACKN signal which resets the ACKN flip-flop, as shown in FIG. 2.

The directives are passed into the unit MPA by the PA2 EN signal and decoded into instructions. At this time there is a 1 of N check on the 3 bit Y field; if there are more than one or zero bits in the Y field the error condition is stored in the status register (bit 17) and indicated to the buffer TDB. The decoded instructions can be separated into two groups, operating mode instructions and functional instructions.

Operating Mode Instructions

These are instructions which must be stored for a complete operation during which several functional instructions could be received. These instructions are stored in the status register. The adapter MPA is always reset on receipt of a mode instruction.

Functional Instruction

These instructions are independent of each other and require storage only during their operation. The storage in the buffer TDB is used for these instructions.

An instruction will be cleared by the subsequent instruction to the buffer TDB.

If the decoded instruction is an operating mode instruction, the buffer MPA resets; and the instruction subsequently stored in the status register is in the appropriate bit positions.

Receiving Data from unit CPU

The unit TMU must receive four words of data before it handles the data.

Software transmits one of the following select instructions which prime the unit TDB for the data:

215 — write 6 bytes,
216 — write 3 bytes,
211 — accept data,
207 — accept data inhibit parity
201 — read-back shift register
202 — read-back NRZ1 (in 6 BYTES)
203 — read-back NRZ1

Next software loads channel with the first data word. The buffer TDB transmits a signal PA DTL to the unit TMU. The unit TMU produces a 500 sec pulse, delayed 500 seconds from the signal PA DTL to produce a signal RST DTL and a signal CLK Word In. The signal CLK Word In toggles the unit Word In Counter to a count of 1 and shifts the word into the first stage of the input buffer. The unit RST DTL resets the signal PA DTL.

The second and third word act similarly stepping the unit Word In Counter to the count of two and three, respectively.

The fourth word produces a signal CLK Word In; however the unit Word In Counter at the count of three inhibits the signal RST DTL and generates a signal SET DATA AVAIL instead. The signal SET DATA AVAIL sets Status bit 16 which starts unit TMU operation.

Considering now the transmitting of data to the CPU unit, there are five cases where data is transmitted to the buffer TDB. They are:

1. 200 — retrieve status,
2. 201 — readback from shift register,
3. 202 and 203 — readback from NRZ1 register,
4. 214 — write check characters and read back, and
5. 213 — read (from tape).

Except for instruction 200, the forming of the word to be transmitted to the unit CPU is similar. (See instruction 200 described hereafter).

Data making up the output word is tested as if it were a 3 byte/word character (8 bits per byte). The data is gated into the output shift register in three steps. During the third step a signal PA2 LOAD DEVICE is generated. The first eight bits are gated into bits 16 to 23 of the output buffer. The second 8 bits are gated into bits 15 to 8 of the output buffer. The third 8 bits are gated into bits 7 to 0 of the output buffer. The MSB in the bytes are bits 23, 15 and 7.

Detailed Description of Instructions

The handling of data between the buffer TDB and the unit MPA for instructions requiring data transfer has been previously described.

Instruction 2 0 0 Load MPA Status into Buffer TDB

This is a request to load the unit MPA status word into the buffer TDB. The outputs of the unit MPA status word are gated into the accumulator which offers them to the buffer input multiplex. The data is gated into the buffer by a LOAD DEVICE signal which in this case is generated within the buffer. Normally when data is loaded into the buffer the LOAD DEVICE signal is provided by the unit PA.

Instruction 2 0 1 Check Shift Register

This is a request by the maintenance software which entails reading data into the shift register buffer storing it and subsequently reading back the data from the output of the shift register to the unit CPU where a bit for bit check can be achieved.

On receipt of the instruction status bits 5 and 9 are set and bit 9 sets up the unit ALLOTTER for 3 bytes per word. Four words of data are received as described in section 3.0.2 resulting in bit 16 being set in the status register. Bit 16 activates the write clock, i.e., the ENABLED PH1 and ENABLED PH2 pulses are made available with the ENABLED PH1 pulse occurring first. The byte ALLOTTER is used to provide the timing for feeding the data back to the unit CPU; the ENABLED PH1 pulse is the clock for the byte ALLOTTER. When the byte ALLOTTER registers the quiescent 0 state, all of the data in the shift register is shifted one position, so that the first word is on the output of the shift register, and the WORD-OUT counter is clocked. When the byte ALLOTTER advances to position 2 the output word is gated into the unit ACCUMULATOR. When the byte ALLOTTER advances to position 3 with the PH2 pulse, the LOAD DEVICE signal is sent to the buffer TDB and the buffer gates the data from the unit ACCUMULATOR into its buffer. While the byte ALLOTTER is still on position 3 the unit ACCUMULATOR is reset by a PH1 pulse, the next word of data is shifted to the output of the shift register and the WORD-OUT counter is clocked.

The buffer TDB upon receipt of the data extends a READY INTERRUPT signal to the unit CPU which results in the data being transferred to the unit CPU. This cycle is repeated until all four words have been retrieved by the unit CPU; the unit CPU then sends a CLEAR instruction.

Instructions 2 0 2 and 2 0 3 Check Write Register

These are requests by the maintenance software which entail reading data into the MPA shift register and subsequently reading back the data from the output of the write register to the unit CPU where a bit for bit check can be achieved. The difference between the two instructions is in the byte structure, 6 or 3 bytes per word respectively.

The instruction is received and stored as bits 6 and 8 or 9 in the status register. Bit 8 or 9 is used to set up the byte ALLOTTER for 6 or 3 byte working. Four words of data are received as previously described, resulting in bit 16 being set in the status register. Bit 16 activates the write clock, i.e., ENABLED PH1 and ENABLED PH2 pulses are made available with the ENABLED PH1 pulse occurring first. The ENABLED PH2 pulse provides the clock pulse for the unit DISTRIBUTOR. The unit DISTRIBUTOR steers the three eight bit bytes into the unit ACCUMULATOR during the PH1 pulse.

Upon the ENABLED PH1 pulse the byte ALLOTTER registers the quiescent 0 state, all the data in the shift register is shifted one position, so that the first word is on the output of the shift register and the WORD-OUT counter is clocked. Upon the ENABLED PH2 pulse the byte is clocked into the write register and the unit DISTRIBUTOR is clocked to position 1. On the next ENABLED PH1 pulse the byte ALLOTTER advances to position 2 and the output of the write register is gated into the unit ACCUMULATOR. This cycle is repeated until all three bytes have been transferred to the unit ACCUMULATOR. The PH1 pulse with the unit DISTRIBUTOR in position 3 is used to send a LOAD DEVICE signal to the buffer TDB. The buffer gates the data from the unit ACCUMULATOR into its buffer and sends a READY INTERRUPT signal to the unit CPU. With the unit DISTRIBUTOR still in position 3 the unit ACCUMULATOR is reset by an ENABLED PH2 pulse. This cycle is repeated until all four words have been read back to the unit CPU. When the unit CPU has retrieved all four words it sends a CLEAR instruction. In the 6 byte mode, instruction 202, 8 words are read back. The reason for this is that the four words from the unit CPU are written on tape in 6 byte mode using byte fill. When the data is read from tape it is formatted in three bytes mode. This makes a computer word to be sent to the unit CPU.

Instruction 2 0 4 On-line

This request is to place the unit on-line; bit 0 in the status register is set. This also causes the unit TMU off line lamp on the maintenance panel to turn off and the lamp on the unit D28 to light.

Instruction 2 0 5 Off-line

This request is to place the unit off-line, bit 0 in the status register is reset. This also causes the unit TMU off-line lamp on the maintenance panel to turn on, and the lamp on the unit D28 to turn off. Bit 0 is the only bit in the status register which is not reset by the TDB CLEAR signal or the MPA reset signal.

Instruction 2 0 6 Stop-Disengage Drive

This is a request to stop the tape motion, i.e., disengage the drive. It is used normally during readback of a pre-written tape so that the unit CPU can stop the tape in inter-block gaps and re-start it without losing data. Thus the unit CPU can control the receipt of data to an integral number of data blocks and does not have to read the complete tape in one action. Receipt of the instruction causes bit 3 of the status register to be reset which in turn causes the Main Ground Switch in the unit MTE to turn off and disengage the drive in the transport.

Instructions 2 0 7 and 2 1 1 - 2 0 7 — Accept More Data and Check Parity; 2 1 1 — Accept More Data These are instructions which result from a request for service by the unit MPA to the unit CPU. They indicate to the unit MPA that a data transfer of four words is imminent. The instruction to receive four words of data is inherent in the following mode instructions: 2 0 1; 2 0 2; 2 0 3; 2 1 5; and 2 1 6.

On the receipt of any of the above instructions the WORD-IN counter is activated and the unit MPA waits the receipt of a data transfer signal PA DTL from the buffer TDB indicating that the first word of input data is available on the output of the buffer. The first PA DTL signal gates the first data word into the MPA shift register, sets the unit ACKN flip-flop and sends a PA2 ACKN signal to the buffer TDB. Two delay circuits in the unit MTE are used to generate a pulse from the PA DTL level; the pulse is used to clock the WORD-IN counter and to send a RST DTL signal to the buffer TDB. This pattern is repeated until the WORD-IN counter indicates that three words have been gated into the shift register. The subsequent PA DTL signal does not cause the fourth word to be gated into the shift register but sets the DATA AVAIL flip-flop bit 16 of the status register. The fourth word remains stored in the buffer TDB, see FIG. 6.

Instruction 2 0 7 is used for maintenance; it causes an error to be forced in the vertical parity bit of the tape byte, by inhibiting the parity bit. The hardware does not generate fill after this instruction. A 211, 214, or 217 signal must be used to prevent an "LRC OVER DUE" ERR.

Instruction 2 1 0 Advance Tape

This is a request to advance the tape (drive the tape forward 6.25 inches), usually to bypass bad spots on the tape. On receipt of the instruction bit 7 is set in the status register and a check is made for the Transport Ready condition (i.e., Transport power on the tape loaded). If the Transport is not ready, an error interrupt is forwarded to the unit CPU via the buffer TDB. If the Transport is ready, status bit 3 is set which engages the drive via the MTE interface circuitry and starts the universal delay. At the end of the universal delay, bit 3 is reset; and the tape drive disengaged. A READY INTERRUPT signal is sent to the unit CPU to indicate that the operation has been completed.

Instruction 2 1 2 Write Tape Mark

This is a request to write the Tape Mark, which indicates to the processing center that there is no more relevant data on the tape.

On receipt of the instruction bit 11 is set in the status register and check is made for the Transport Ready condition (i.e., Transport D.C. power on and tape loaded). If the transport is not ready an error interrupt is forwarded to the unit CPU via the buffer TDB. If the transport is ready, status bit 3 is set which engages the drive via the MTE interface circuitry and starts the universal delay. At the end of the universal delay the CHECK CHARACTER TIMER is enabled in the write mode; and the Tape Mark character is written on tape by setting the appropriate bits in the write register. When the timer reaches position 15 the write register is reset which generates the LRC character (this is identical to the Tape Mark character) and the status bit 15 is set. Status bit 15 being set causes status bit 3 to be reset which disengages the tape drive. A READY INTERRUPT signal is sent to the unit CPU to indicate that the operation has been completed. (Note that the CRC is not written. "Tape Mark" is an EBCDIC character, bits 3, 6 and 7).

Instruction 2 1 3 Read Only

This is used when data is to be read into the unit CPU from a pre-written tape. On receipt of the instruction bit 10 is set in the status register which activates the unit DISTRIBUTOR. A check is made for the Transport Ready condition (i.e., Transport D.C. power on and tape loaded). If the Transport is not ready an error interrupt is forwarded to the unit CPU via the buffer TDB. If the Transport is ready, status bit 3 is set which engages the drive via the MTE interface circuitry. The first read pulse is received will set status bit 18 which enables the CHECK CHARACTER TIMER to allow it to detect the check characters when they appear. The clock for the DISTRIBUTOR is the gate pulse, generated from the first bit of each byte which is read. Thus, the distributor steps to position 1; and, on receipt of the read clock pulse, the first byte less the parity bit is transferred from the DESKEW REGISTER to the ACCUMULATOR. The gate and read clock, pulses cause the next two bytes to be transferred to their appropriate locations in the ACCUMULATOR which is then full. It contains three eight bit bytes. With the DISTRIBUTOR in position 3 the read clock pulse is used to send LOAD DEVICE to the TDB. The TDB then gates the data into its buffer and sends a ready interrupt to the unit CPU. The Clock 4 pulse resets the ACCUMULATOR. The following gate pulse steps the DISTRIBUTOR to position 1; and the cycle is repeated. When the LRC character has been read, status bit 19 is set and the CHECK CHARACTER TIMER is reset and disabled until bit 19 is reset at the beginning of the next data block. Data blocks continue to be read back to the unit CPU until a stop instruction 2 0 6 is received or the end of tape is reached.

Instructions 2 1 4 and 2 1 7 Data Block Complete

These instructions indicate to the MPA that the data block is complete, 2 1 4 is a maintenance instruction which also indicates that data read back is required and the write register reset which generates the LRC character is used to force an error in the longitudinal check register. Both instructions set bit 12 in the status register while instruction 2 1 4 also sets bit 10. Bit 12 activates the CHECK CHARACTER TIMER in the write mode, and stops the ENABLED PH1 and ENABLED PH2 pulses, when the WORD-OUT counter reaches position 0. Thus the write register is no longer being clocked. When the CHECK CHARACTER TIMER reaches position 7 the first character of the last word is again clocked into the write register to become the dummy CRC character. When the timer reaches position 15, status bit 15 is set, and the write register is reset to produce the LRC character. The timer continues to be clocked but should be reset by a read clock pulse (if it is not reset the timer sets bit 20 in the status register and generates an error interrupt). The timer continues to count and be reset by read clock pulses until the equivalent of four bytes of blank tape occurs, during which there are no read clock pulses. After this point any read clock pulse that occurs within timer positions 5 and 12 is assumed to be the CRC character and any read clock pulse occurring within positions 12 and 21 is assumed to be the LRC character. If the LRC is not located status bit 20 is set and an error interrupt is generated. When the LRC character is located status bit 19 is set which causes bit 3 to be reset and disengage the tape drive. A READY INTERRUPT signal is sent to the unit CPU to indicate that the operating has been completed.

Instructions 215 and 2 1 6 Output Data

These are requests to write data to the tape. The only difference between the two instructions is in the byte structure, 6 or 3 bytes per word respectively. The instruction is received and stored as bits 13 and 8 or 9 in the status register. Bit 8 or 9 is used to set up the byte ALLOTTER for 6 or 3 byte working respectively. A check is made for the Transport Ready condition (i.e., Transport D.C. power on and tape loaded). If the transport is not ready an error interrupt is forwarded to the unit CPU via the buffer TDB. If the transport is ready status bit 3 is set, which engages the drive via the MTE interface circuitry, activates the write and erase amplifiers and initiates the up to speed delay (80 ms) in the unit MTE.

While the tape is accelerating to running speed, four words of data are received and stored as described in section 3 0 2. The fourth word sets status bit 16 (Data Avail). If, when the up to speed delay is complete bit 16 is not set an ERROR INTERRUPT signal is sent to the unit CPU via the buffer TDB. The completion of the up to speed delay activates the write clock, i.e., ENABLED PH1 and ENABLED PH2 pulses are made available with the ENABLED PH1 pulse occurring first. The first ENABLED PH1 pulse steps the byte ALLOTTER off the quiescent 0 state to position 1, and all the data in the shift register is shifted one position, so that the first word is on the output of the shift register and the WORD-OUT counter is clocked to position 1. While the byte ALLOTTER in position 1 the first byte of the word on the output of the shift register appears on the output of the byte gates and the byte output is fed to the parity generate circuit. On the ENABLED PH2 pulse the byte including the parity bit is clocked into the write register. Any change of state in the write register appears, via the write amplifier and write head, as a bit on the tape. On the next ENABLED PH1 pulse the byte ALLOTTER steps to position 2 and the next byte is fed to the write register on the ENABLED PH2 pulse. This continues until the whole word has been written on the tape, the last byte being the third or sixth according to the byte structure. The next ENABLED PH1 pulse sets the byte ALLOTTER to position 1 and shifts the next word to the output of the shift register while stepping the WORD-OUT counter. The second word is then written on the tape. The third word is written on the tape in the same manner and when at the end of the third word the WORD-OUT counter steps to position 4 at the PA2 SET READY signal to sent to the buffer TDB which forwards a READY INTERRUPT signal to the unit CPU.

This READY INTERRUPT is a request to the unit CPU for the next instruction. There are four likely instructions, 2 0 7 or 2 1 1 which prepare the MPA for receipt of more data, see section 3 0 2. Four more words of data are received by the shift register and written on tape and when the WORD-OUT counter steps to position 4 another ready interrupt is generated, this cycle of operation continues until all the data forming the data block has been written on tape. The next instruction is either 2 1 4 or 2 1 7.

It is expected that the new data is received by the time the fourth word has been written on tape such that the new data can follow immediately onto the tape. It is possible, however, that the unit CPU may not always be able to supply the new data within this time and for this situation hardware fill characters are written on tape. In IBM systems, the LRC character should always be odd parity; but the CRC character can have odd or even parity. This allows an even or odd number of data bytes in the block. The true CRC character is not generated, it will be a variable dummy character with odd parity, thus to insure odd parity for the LRC character there must be an even number of bytes in the data block. This means that data must always be in even numbers of bytes, also the hardware fill must always be an even number of bytes.

If new data has not been received by the time the last byte of the last word has been written on tape, the WORD-OUT counter steps to position 0 instead of position 1 and the output of the shift register is reset. Fill characters are written on tape, the minimum being one word of 6 bytes. The byte structure is arranged for 6 bytes during fill character generation in order to maintain an even number of bytes in the data block. After each word of fill a check is made for new data. If the tape is at the BOT, writing is inhibited until the tape moves 6.25 inches. After this interval, writing begins as described above.

Description of the Transport Electronics

The following sections describe the transport electronics consisting of the read/write electronics.

Write and Read Back Check

This is achieved using the following combination of instructions. The data is written on tape using instruction 2 1 5 or 2 1 6 according to the byte structure required. When the data block is complete, instruction 2 1 4 is used to indicate the end of data block; it also indicates that readback of data is required and it inhibits the reset of the write register to force a longitudinal parity error in the error check register. (The Write Register is toggled at this time, creating a false LRC character).

The system is not capable of simultaneously passing data in both directions, thus any data block used in this mode is limited to 200 characters by the interhead gap between write and read heads.

Write Register and Amplifiers

The write register operates in the NRZI mode (Non Return to Zero change on One) in which the state of the register changes each time a ONE is received. Thus each register storage bit acts as an odd/even counter for its particular tape track. The LRC character is used to force all the tracks to an even number of bits and this is achieved simply by resetting the write register. The write amplifiers provide the drive power to the heads.

Read Amplifiers and Deskew Register

The read amplifiers provide the function of detecting a flux reversal on the tape and producing a digital output from it. The read timing is derived from the data on the tape, all nine digital outputs from the amplifiers are capable of initiating the character gate (i.e., the first bit received will operate the gate). Each bit is latched in the DESKEW REGISTER when it is read and at the end of the character gate a clock pulse is generated to gate the data out of the DESKEW REGISTER. Following the clock pulse is a reset pulse which resets the DESKEW REGISTER in preparation for the next character.

Y field 1 of N Check

The X and Z fields are checked in the buffer TDB but the Y field is not, hence, the check is provided in the unit MPA. An error results in a device error signal to the buffer TDB and status bit 17 is set, as previously described.

Vertical Parity Check

The output from the DESKEW Register is fed to the check circuit and an even parity condition results in a device error signal to the buffer TDB and status bit 21 being set by the read clock pulse. The check is inhibited for the CRC character in the read mode since this character can legitimately have odd or even parity.

Longitudinal Parity Check

The output from the DESKEW REGISTER is gated into the LONGITUDINAL CHECK REGISTER by the read clock pulse for each byte read from the tape. The LRC character causes the LONGITUDINAL CHECK REGISTER to end up in the reset condition at the end of data block. If when status bit 19 is set the register is not reset a device error signal is sent to the buffer TDB and status bit 22 is set.

Errors are forced for checking purposes by clocking the write register rather than resetting it when the CHECK CHARACTER TIMER reaches position 15. This causes an erroneous LRC character to be generated which insures that the LONGITUDINAL CHECK REGISTER does not end up in the reset condition at the end of a data block.

Tape Movement Check

The Transport has no equipment to indicate tape speed (e.g. tachometer) and although the read after write parity check catches out of tolerance speed variations due to cell compression or expansion it is not able to provide for the case where the tape is not moving at all. This is because there are no read clock pulses when the tape is stationary. The CHECK CHARACTER TIMER locates this condition when it is searching for the check characters during readback. No read clock pulses are available to reset the timer and it reaches position 21, sets status bit 20 and generates an ERROR INTERRUPT signal. This does not work for the read only case if the tape has never moved, since in this case the CHECK CHARACTER TIMER is initiated by the first read pulse in order to avoid the inter block gap.

For maintenance purposes the condition of stationary tape can be simulated by a moving blank tape which is achieved by inhibiting the vertical parity bit.

Read Clock Inhibit Timer

This timer is used to prevent reading of data within the 3.75 inches after the amplifier BOT mark. This allows maintenance personnel to put a new amplifier mark on a broken tape without erasing the tape before and after the new amplifier mark.

File Protect

This is a standard protection device to guard against overwriting on protected tapes. A file protect ring must be present in the supply reel in order for the write amplifiers to be enabled. The sensor on the Transport causes status bit 2 to be set. This generates an error indirectly (either LRC overdue or block time out), which is found when running the test subsequent to loading the reel of tape.

Beginning of Tape Indicator BOT

This is a reflective marker on tape which is sensed by a photocell on the Transport. If the amplifier BOT marker is present when the unit MPA receives a request requiring tape motion the universal delay is used to produce 6.25" of blank tape before entering data on the tape. This request is a test instruction subsequent to loading.

End of Tape Indicator EOT

This is a reflective marker on the tape which is sensed by a photo-cell on the Transport. It is located on the opposite edge of the amplifier BOT marker. When the marker is sensed status bit 4 is set.

No Tape Condition

The condition where both amplifier EOT and amplifier BOT markers are sensed simultaneously indicates a no tape condition which results in status bit 14 being set and an ERROR INTERRUPT signal being sent to the unit CPU.

Writing the Check Characters

At the end of a block of data, the software sends a 217 command to indicate to the unit MPA that the block of data is complete.

The unit MPA then, after writing the last word, writes the CRC and LRC Check Character.

Whenever the unit MPA finishes writing one block of four words, and if there is no more data available, so that STAT BT 16 is reset, the next PHASE 1 pulse:
1. Steps the allot counter to ALLOT 1.
2. Steps the word out counter to WORD OUT 0.
3. Automatically shifts to the 6 byte/word write mode, regardless of the previous write mode (3 or 6 byte/word).
4. Initializes the hardware to write hardware fill (null character P000000000), i.e., fill bits (most significant 4 bits in byte) are now 0000 instead of 1111 as in the true 6 byte/word mode.
5. Does not reset the word out shift register.

Thus, when the unit MPA comes to writing the CRC, it writes the first byte four most significant bits in the word out shift register) as in the 6 byte/word mode except that the fill bits are 0000— CRC—

POOOOXXXX—XXXX, depending on what was in the first byte of the last word.

After the unit MPA has written the CRC, it resets the NRZI register and the change in the NRZI state corresponds to the LRC Check Character.

The unit LRC then takes into account all the data as well as the dummy CRC being written for that block of data, so that the unit LRC will be correct.

NRZI Recording

These are numerous means of recording on magnetic tape. To list a few, there are:
1. Frequency modulation
2. Phase modulation
3. RZ — return to zero
4. NRZ — nonreturn to zero
5. NRZ0 — nonreturn to zero and change on 0, and
6. NRZ1 — nonreturn to zero and change on 1.

To be compatible, with IBM Corporation machines the toll ticketing uses NRZI recording. As an example of the NRZI arrangement, see FIGS. 5 and 8. The NRZI format usually implies 7 to 9 track tape with strict requirements on bits to track positioning.

Figure 5:
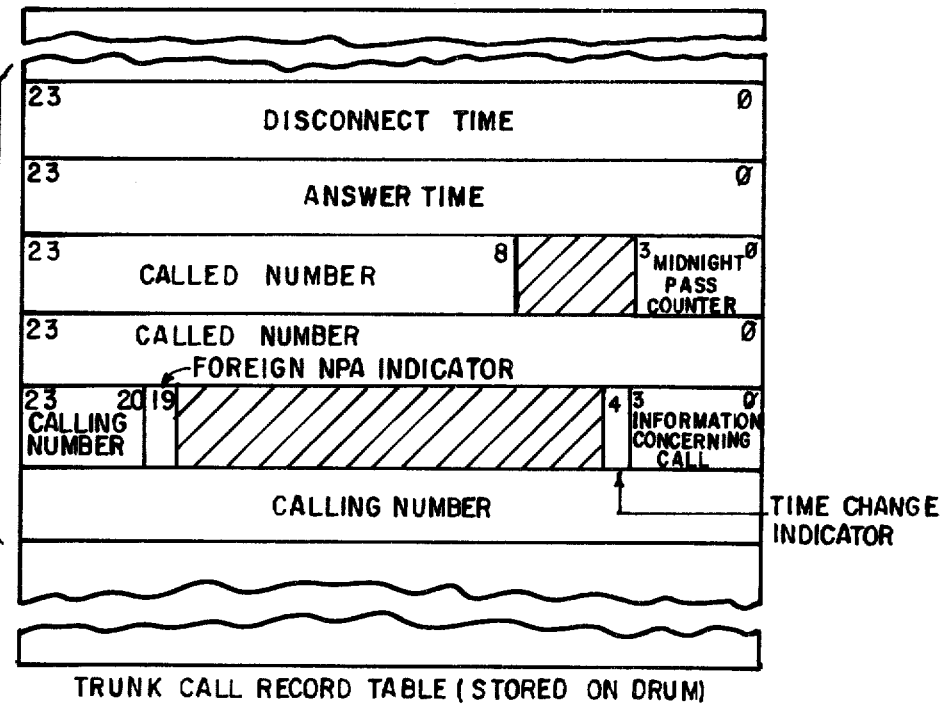

In FIG. 5, one data bit is clocked into a NRZ1 register. Note the flip/flops only change when a one is clocked into it.

In NRZ1, the intelligence on the tape is the change of flex (not necessarily the polarity of the flux). Initially, the tape is polarized in one direction; the erase head polarity determines the direction of flux. See FIG. 8.

EBCDIC Code

There are many intelligence codes which can use NRZ1. A few of these are listed below:
1. Binary
2. ASCII, and
3. EBCDIC — Extended Binary Coded Decimal Interchange Code.

IBM uses EBCDIC. (EBCDIC is an eight bit character). Although toll ticketing uses EBCDIC, all codes have industry standards as to bit to trunk positioning. FIGS. 6 and 9 show the EBCDIC bit to track positioning on tape.

Word Organization into 6 Bytes or 3 Bytes.

The toll ticketing TMU has two modes for writing date, and mode for reading, the mode being the tape data format. The write modes are 6 byte and 3 byte. The Read Mode is a 3 byte only. A byte represents an intelligent character; ticketing bytes are 4 bits and 8 bits of data. As the system words are 24 bits, a word has 3 bytes of 8 bits or 6 bytes of 4 bits. To understand the break-down of a ticketing data word, two examples are shown.

3 BYTE DATA WORD

| 1ST BYTE | 2ND BYTE | 3RD BYTE |
|---|---|---|

23                                                                           0
7        0 7        0 7

6 BYTE DATA WORD

| 1ST BYTE | 2ND BYTE | 3RD BYTE | 4TH BYTE | 5TH BYTE | 6TH BYTE |
|---|---|---|---|---|---|

23                                                                           0
3    0 3    0 3    0 3    0 3    0 3    0

The sequence for writing on tape is first byte, second byte, third byte in the 3 byte mode and first, second, . . . , sixth in the 6 byte mode. In the 6 byte mode bits 4 through 7 are hardware filled with "ones"; thus both modes write an 8 bit EBCDIC character on tape. See FIGS. 6 and 7.

The unit TMU writes two types of "fill". One type is a "byte fill;" the other is a hardware generated fill character. The "byte fill", sometimes referred to as a nibble, is adding bits to the byte to "fill" the EBCDIC character to the required 8 bits. These bits become bits 4 through 7 of the character and are all one's. See FIGS. 6 and 7.

The hardware fill character is zero in bits 0 through 7 plus parity bit at a one. It is equivalent to the "null" character in EBCDIC. It is required because the unit CPU can not always return to the unit TMU on receiving the "ready" as it has higher priority jobs to perform. Until the unit CPU returns, something must be written on tape, a character that cannot be interpreted as ticketing data. The null character is such a vehicle.

LOCAL AUTOMATIC TOLL TICKETING SOFTWARE — GENERAL DESCRIPTION

The essential function of the toll ticketing subsystem LAMA is to collect, format, and record toll utilization data for future processing. The data gathered and reported is used for customer billing, toll separation, traffic engineering studies, planning and evaluation of toll services, and maintenance of toll facilities. The toll ticketing subsystem does not enter into or interfere with the call processing function, except as may be necessary to prevent revenue loss.

The toll ticketing equipment is intended for operation in a Class 5 office for local automatic message accounting LAMA. The ticketing equipment tickets only customer dialed automatic number identification (ANI) traffic. This customer dialed ANI traffic may be either direct distance dialed (DDD) toll traffic or message rate service (MRS) local traffic. EDDD traffic is routed to TSPS or CAMA offices, and is not processed by the toll ticketing subsystem.

The LAMA ticketer tickets only calls originating within the local office. All DDD calls are ticketed on the outgoing trunk. All MRS calls are ticketed on originating junctors or incoming trunks serving high usage lines, such as PABX lines.

DDT traffic is ticketed as a timed call. The toll ticketing equipment supervises the call for both answer and disconnect times so that total conversation time can eventually be determined. The final determination time is done at the accounting center. DDT traffic is restricted to station-to-station sent paid (SSPD) calls and to multimessage unit (MMU) calls.

Message rate service traffic is ticketed as pegged calls. The toll ticketing equipment supervises the call for the answer state only. That is, information is collected only as required to determine that answered call took place and not to determine the total conversation time.

The toll ticketing equipment is capable of detecting permanent trunk fault conditions of the type which:

a. prevent the trunk from returning answer supervision to the ticketer (permanent unanswered state), or b. prevent the trunk from removing answer supervision to the ticketer (permanent answer state).

In addition to the recording of call data for billing purposes, the toll ticketing equipment also is capable of recording call data for certain preselected office administration functions, including traffic sampling studies, traffic service observation studies, and maintenance information. The data recorded for office administration purposes may differ in content, or may require different interpretation than the data recorded for billing purposes.

Traffic sampling refers to the constant supervision of certain type calls such that a preselected percentage of these calls are ticketed. The purpose of traffic sampling normally is to collect data for division of revenue studies. The toll ticketing equipment provides for traffic sampling of the following:

a. 100 percent of all completed outgoing INWATS calls, b. 20 percent of all completed outgoing switch service network (SSN) calls, and c. 10 percent of all completed outgoing flat rate WATS calls.

Traffic observation refers to the temporary supervision of certain trunk group such that during certain intervals of time, usage of these trunks is ticketed. The instruction to initiate a selected traffic service observation is entered into the system via the office administration teletypewriter. The ticketing operation continues until a subsequent input instruction via the teletypewriter terminates the study. When a trunk group is marked for study all calls via that trunk group are ticketed, completed and non-completed, billable and non-billable. The call records of incomplete and non-billable calls are marked with a special coded information character for easy identification.

General Hardware Organization

The peripheral equipment consists of duplicated ticketing magnetic tape units (TMU) and duplicated ticketer scanner units (TSU). These units are electromechanical and are interfaced to the electronic equipment via peripheral adapters. The peripheral adapters are controlled by duplicated ticketing device buffers (TDB). Each buffer TDB then controls two peripheral adapters, one for a unit TSU and one for a unit TMU. The TDB buffers interface with an associated CCX multiplex which interfaces with the data processing unit DPU.

ATT Subsystem Configuration

Normal configuration is such that one TDB buffer services a TSU unit while the other TDB buffer services a TMU unit. This configuration is reversed on a scheduled basis so that the TDB buffer that was servicing a TSU unit now services a TMU unit and vice versa. This allows equal exercise of the devices.

Should a fault occur in a TDB buffer, TSU unit, or TMU unit, a single channel through one TDB buffer is established and that TDB buffer is shared by the associated TSU unit and TMU unit. The TMU unit in such a case assumes a higher priority in usage. Thus in normal configuration a configuration could exist where TDB-A buffer services TMU-A unit and TDB-B unit services TSU-B unit. Then to equalize the load the configuration could be changed so that TDB-A buffer services TSU-A buffer and TDB-B unit services TMU-B unit. Should a fault occur in TDB-B buffer, TSU-B unit or TMU-B unit, then TDB-A buffer services both TSU-A unit and TMU-A unit.

Ticketing Device Buffer TDB

The ticketing device buffer (TDB) provides the I/O interface to the computer complex. It is equipped in duplicate, each unit serving one scanner and one magnetic tape channel. In normal operation one TDB buffer is used to service the I/O operation to the scanner and the other services the magnetic tape unit. The role is switched on alternate days. Under fault conditions, one TDB buffer services both a scanner and a magnetic tape unit simultaneously. The TDB buffer is similar to the channel device buffer.

ATT Sense Lines and Interrupt Levels

As previously mentioned each TDB buffer is considered a controller and each has its own channel. Channel 3 for TDB-A buffer and channel 4 for TDB-B buffer. Each channel has five sense lines associated with it and two of the five sense lines can initiate an interrupt.

The sense lines are as follows:

62002 — SC SELECT 3: When true this sense line indicates that channel 3 has been selected.

63002 — SC SELECT 4: When true this sense line indicates that channel 4 has been selected.

55002 — SC ON LINE 3: When true this sense line indicates that TDB-A has been placed on line.

57002 — SC TO ERR 3: When true this sense line indicates that channel 3 did not respond on any attempt to SEL the channel.

61002 — SC TO ERR 4: When true this sense line indicates that channel 4 did not respond on an attempt to SEL the channel.

51002 — SC ROY SL1 3: When true this sense line indicates that the channel has completed the task assigned to it. If properly armed (bit 14 true of the SEL instruction) an interrupt will occur in priority level 7.

52002 — SC ROY SL1 4: When true this sense line indicates that the channel has completed the task assigned to it. If properly armed (bit 14 true of the SEL instruction) an intertupt will occur in priority level 7.

53002 — SC ERR 3: When true this sense line indicates that the channel 3 has an error associated with it. This indication also produces an interrupt of priority level 6.

54002 — SC ERR 4: When true this sense line indicates that the channel 4 has an error associated with it. This indication also produces an interrupt of priority level 6.

Ticketing Scanner Unit

The TSU Ticketing Scanner Unit is a medium-speed electronic scanner/multiplex device. Its function is to supervise the scan point switches located on the ATRF frame which in turn monitor the trunks and OJ junctors for answer supervision. The TSU unit functions under address control by the central processor. Each scan address retrieves the status of 24 scan points. Up to 120 scan addresses can be applied for DDD ticketing. This provides for a maximum of 1440 ticketed outgoing trunks. The remaining 120 scan addresses can be applied to MRS metering. This allows for a maximum of 2880 OJ junctors and incoming trunks. In addition 80 addresses are available for routining and fault localization.

FIG. 2 shows the TSU unit scan sequence. All DDD ticketed points are scanned at 300 millisecond intervals and all MRS metered points are scanned at intervals ranging from 300 MS to 2.4 seconds depending on the office size.

For ticketed DDD calls the TSU unit monitors two normally open contacts associated with each outgoing trunk circuit accessible by DDD traffic. When both the H (hold) and A (answer) contacts are open the trunk is in the idle state. When H is closed and A is open the trunk is seized but not answered. When answer supervision is returned both the H and A contacts are closed.

trunks (DDT scanpoints). All scan points within a single file must be dedicated to either MRS or DDD service. An ATR frame can, therefore, be engineered for the following combination of scan points.

| Combination | MRS No. Files | No. Metered Ckts. | No. Files | DDD No. Ticketed Ckts. |
|---|---|---|---|---|
| 1 | 4 | 2880 | 0 | 0 |
| 2 | 3 | 2160 | 1 | 360 |
| 3 | 2 | 1440 | 2 | 720 |
| 4 | 1 | 720 | 3 | 1080 |
| 5 | 0 | 0 | 4 | 1440 |

The ATTF unit is a duel frame unit containing two magnetic tape transports, the ticketing scanner unit and all the associated control electronics. The major component parts of the ATTF unit are the TSU (ticketing scanner unit), the TMU (ticketing magnetic tape unit) and the TDB (ticketing device buffer).

TDB-A—ticketing device buffer — Channel A
TDB-B—ticketing device buffer — Channel B
TMU-A—ticketing magnetic tape unit — Channel A
TMU-B—ticketing magnetic tape unit — Channel B
TSU-A&B—ticketing scanner unit (The TSU unit serves both channel A and B. Its active elements are internally duplexed).

At any point in time only one of the TMU unit and

|  | CONTACT H(Hold) | A(Answer) |  |
|---|---|---|---|
| Trunk idle | 0 | 0 | Note: 1=closed |
| Trunk seized | 1 | 0 | contact |
| Trunk received answer supervision | 1 | 1 | 0=open contact |
| (invalid state) | 0 | 1 |  |

With one scan address the TSU unit scans all H contacts of a group of 24 trunks. On the succeeding address the A contacts of the same groups of trunks are scanned.

It takes a nominal 40 microseconds to execute one scan address. Hence, it takes 80 microseconds nominal to scan a trunk group consisting of 24 DDD trunks.

For a metered MRS call the TSU unit monitors a single normally open contact associated with each MRS originating junctor or incoming trunk. During the monitoring interval, which starts return of answer supervision from the called party, 24 MRS circuits are monitored with each scan address, representing a scan rate of 24 points per 40 microseconds.

The ATR frame (ATRF) is a single frame unit containing the scan point devices monitored by the ticketing scanner unit. The scan point device is a 1A correed. The coil of the correed is wired to the trunk or originating junctor being monitored. The contact of the correed is supervised by the scanner. The frame serves 2880 scan points. A fully expanded LAMA subsystem includes two frames, or 5760 scan points. Each ticketed outgoing trunk requires two scan points. Each metered originating junctor or incoming trunk requires one scan point. All MRS calls are metered on originating junctors and incoming trunks.

Each ATR frame consists of four equipment files. Each file contains 720 scan points. These 720 scan points can serve either 720 originating junctors or incoming trunks (MRS scan points) or 360 outgoing TSU unit channels is active. The other channel is in the standby mode. If a fault is detected in the active channel the system reconfigures under program control to the standby channel. Reconfiguration can also be manually initiated on alternate days so each unit is regularly exercised.

SEL Instruction Explanation for ATT

The operand portion of the select instructions is decoded in the peripheral devices into directives.

The select instructions prime the hardware to do a specific sequence of events.

The OP Code of the select instruction associated with the ATT subsystem is 05.

The operand portion of the SEL INST is sub-divided into fields that serve separate functions.

The identity of each ATT channel is given by the C field;

a. for ATT channel A, CPU channel 3, the C field is 02.

b. for ATT channel B, CPU channel 4, the C field is 03.

The identity of the ATT sub-units is given by the X field;

| Unit | C Field | X Field | Y Field | Z Field |
|---|---|---|---|---|
|  |  |  | Directive Fields | |
| 1. TDB-A | 02 | 00 | | |
| 2. TSU-A | 02 | 01 | | |
| 3. TMU-A | 02 | 02 | | |
| 4. TDB-B | 03 | 00 | | |

| Unit | C Field | X Field | Y Field | Z Field |
|------|---------|---------|---------|---------|
|      |         |         | Directive Fields | |
| 5. TSU-B | 03 | 01 | | |
| 6. TMU-B | 03 | 02 | | |

In the peripheral adapters, the directives are decoded from the Y and Z fields.
For the TSU unit the directives are:
X Y Z — FIELDS 1 0 0 — DIRECTIVE 0 Load TSU unit Error Status — This causes the TSU unit to gate its Error Status Word into the TDB buffer.

1 0 1 — DIRECTIVE 1 Check Data Communication (Maintenance Directive only) — When any word of data is received after this SEL instruction, the TSU unit gates this data into the TDB buffer.

1 0 2 — DIRECTIVE 2 Scan Operation (Maintenance Directive also) — When a word of data (scan address) is received after this SEL instruction the TSU unit interrogates a specific group of 24 slave relay contacts and gates their status into the TDB buffer. The word format is explained under TSU Data Communication.

1 0 3 — DIRECTIVE 3 Check Directive 1 of N circuit (Maintenance Directive only) — When any word of data is received after this directive, the TSU unit purposely introduces an error in the directive 1 of N Check Circuitry. This action causes a program time-out to be sensed.

1 0 4 — NOT USED This causes a "NO" DIRECTIVE ERROR if used.

1 0 5 — DIRECTIVE 5 Switch TSU/OFF LINE (Reconfiguration Directive only) This causes the TSU unit to switch OFF its scanning circuitry and thus renders them unaddressable. A program time-out occurs if any directive is received when the TSU unit is in this state.

1 0 6 — DIRECTIVE 6 Switch TSU ON LINE (Reconfiguration Directive only) This causes the TSU unit to switch ON its scanning circuitry and thus renders them addressable. It takes 16.6 milliseconds for the TSU unit to switch ON.

1 0 7 — NOT USED (This causes a "NO" DIRECTIVE ERROR if used).

TSU Unit Data Communication

The transmittal and reception of data to and from the peripheral devices is discussed previously.

1. CCO (3330000) Copy Character Out
RA—Peripheral Device
0–23                                  1 cycle
2. CCI (3370000) Copy Character In Peripheral
Device — RA
0–23                                  N + 7 cycles
N = number of bits shift in RA
or as previously explained.
3. LDC (74) Load Device Channel MDR—Peripheral Device
0–23                                  2 cycles
4. STC (75) Store Device Channel
Peripheral Device—MDR
0–23                                  2 cycles The data communication for the TDB buffer is the same as that for the CDB unit and is explained previously.

| 1. Data Format for Scanning Operation (Scan Address) |||||||||
|---|---|---|---|---|---|---|---|---|
| 15 | 14 | 13 | 12  11 | 10  9 | 7  4 | 3  0 |||
| INHIBIT RESET ACKN. STRET. | TIMING ERROR MAINTENANCE | NOT USED | BATTERY DRIVER MAINTENANCE | GROUND SWITCH MAINTENANCE | BATTERY DRIVER FIELD | GROUND SWITCH FIELD |||

A. Bits 0 to 3 are decoded such that:
Bit 3 2 1 0
0 0 0 0 = Ground Switch 00
0 0 0 1 = Ground Switch 01
1 1 1 1 = Ground Switch 15

Only these groups are used for scanning purposes. In conjunction with bit 8, this field is extended for maintenance purposes only and serves:

| Bit 8 3 2 1 0 | |
|---|---|
| 1 0 0 0 0 | Ground Switch 16 |
| 1 0 0 0 1 | Ground Switch 17 |
| 1 0 0 1 0 | Ground Switch 18 |
| 1 0 0 1 1 | Ground Switch 19 |

Bit 9 is used, for maintenance only, to check 1 of N circuits, for no selection. Refer to table below:
Bit 9 . GS address 00 = GS DECO no selection error
Bit 9 . GS address 01 = GSCA no selection error
Bit 9 . GS address 02 = GSCO no selection error
Bit 9 . GS address 03 = BDCA no selection error Bit 10 is used, for maintenance only, to check the 1 of N circuits for a double selection of GSCO 19 and whichever is selected by the normal ground switch field (bits 0 to 3 and 8).

B. Bits 4 to 7 are decoded such that:

| Bit 7 6 5 4 | |
|---|---|
| 0 0 0 0 | Battery Driver 00 for maintenance only. |
| 0 0 0 1 | Battery Driver 01 |
| 0 0 1 0 | Battery Driver 02 |
| 1 1 1 1 | Battery Driver 15 |

Only battery drivers 01 to 15 are used for scanning purposes.

Bit 11 is used, for maintenance only, to check the 1 of N circuits for no selection. Refer to table below:
Bit 11 . BD address 01 = BD DECO no selection error
Bit 11 . BD address 02 = BDCO no selection error.

Bit 12 is used, for maintenance only, to check the 1 of N check circuits for a double selection of input 19 of the circuit and whichever input is selected by the normal battery driver field (bits 4 to 7).

TSU Unit Error Status Word

A logic 1 is required for the explanation of the bit to be true.

| BIT | EXPLANATION |
|---|---|
| 0 | Not used |
| 1 | Not used |
| 2 | Not used |
| 3 | Not used |
| 4 | SA STRB REG indicates an error in SENSE AMP strobe circuitry. |
| 5 | BBD ENA ERROR indicates a BD ENABLE ERROR. |
| 6 | Ground Switch Core 1 of N Error 2<br>None or more than one ground switch core has been selected during the second portion of the TSU unit sequence. |
| 7 | Ground Switch Core 1 of N Error 1<br>None or more than one ground switch core has been selected during the first portion of the TSU unit sequence. |
| 8 | Ground Switch Cable 1 of N Error 2<br>None or more than one ground switch cable has been selected during the second portion of the TSU unit sequence. |
| 9 | Ground Switch Cable 1 of N Error 1<br>None or more than one ground switch cable has been selected during the first portion of the TSU unit sequence. |
| 10 | Battery Driver Cable 1 of N Error<br>None or more than one battery driver cable has been selected during the whole TSU unit sequence. |
| 11 | Battery Driver Core 1 of N Error<br>None or more than one battery driver core has been selected during the hole TSU unit sequence. |
| 12 | Ground Switch Decode 1 of N Error<br>None or more than one ground switch was decoded during the whole TSU unit sequence. |
| 13 | Battery Driver Decode 1 of N Error<br>None or more than one battery driver was decoded during the whole TSU unit sequence. |
| 14 | Timing Error<br>If any signal from the timer for the TSU unit is missing during the sequence this bit will be set. |
| 15 | Error Enable Signal<br>This is the end of the TSU unit sequence and this bit is set whenever this signal occurs. |
| 16 | DIRECTIVE 5<br>Whenever DIRECTIVE 5 is received this bit is set. |
| 17 | OFF Line Error<br>TSU unit is not switched OFF properly |
| 18 | DIRECTIVE 6<br>Whenever DIRECTIVE 6 is received this bit is set. |
| 19 | ON Line Error<br>TSU unit is not switched ON properly |
| 20 | Reset Acknowledge Error<br>If the circuitry for the TSU unit is not reset between operations this bit is set and an error is indicated. |
| 21 | Directive Error Type 1<br>Whenever the Directive 1 of N Check circuit indicates an error and the TSU unit is not operating under DIRECTIVE 0 this bit is set. |
| 22 | Directive Error Type 2<br>Whenever the Directive 1 of N Check circuit indicates an error and the TSU unit is operating under DIRECTIVE 0 this bit is set. |
| 23 | Error Status Enable<br>Whenever DIRECTIVE 0 is received this bit is set. |

TSU Unit Modes of Operation

The TSU sub-units of the ATT subsystem operate in the sense ready mode. Hardware errors are indicated through an error interrupt signal. The hardware generally resets itself at the end of every SEL INST and every LDC/CCO hardware sequence.

A CLEAR INST can be used. The operand of this instruction is, bit $14 = 0$, $X = 0$, $Y = 1$, $Z = 7$.

Reading of TSU unit Error Status Word DIRECTIVE 0. The error status word is generally required after an error has been indicated by the hardware through the error interrupt signal. Since, in the ATT subsystem, the TDB buffer, TSU unit and TMU unit all have a common error interrupt signal, it might be necessary to check which unit is causing the interrupt, in which case the sequence of events is:

1. SEL INST (operand is bit $14 = 0$, $X = 0$, $Y = 0$, $Z = 0$) to gate the TDB buffer status word on the CPU unit data bus
2. STC/CCI to read TDB buffer error status word
3. SEL INST (operand is bit $14 = 0$, $X = 1$, $Y = 1$, $Y = 0$, $Z = 0$) to gate the TSU unit status word on the CPU unit data bus
4. STC/CCI to read TSU unit error status word There is no timing involved as each TDB buffer and TSU unit sets its error status word on the output buffer on receipt of the directive.

Data Communication Check (DIRECTIVE 1)

This mode of operation is used to check the correct operation of the data communication channels between the CPU unit, TDB buffer and TSU unit. It is normally used by maintenance programs. The sequence of events is;

1. SEL INST (operand is bit $14 = 0$, $X = 1$, $Y = 0$, $Z = 1$) to initiate the hardware for the check operation.
2. LDC/CCO any data pattern. This starts the hardware sequence.
3. A Sense Ready signal is sent approximatley 35 micro seconds later.
4. STC/CCI to read the data back. The data read back should be exactly the same as the data in.

The timing required for the operation of the TSU unit under this directive is about 35 microseconds. If no sense ready signal occurs before 50 microseconds, it can be assumed that the hardware is not functioning correctly and the application program should change to time out status and initiate a diagnostic process on the unit.

Performing a Scan Operation DIRECTIVE 2

This is the primary mode of operation of the TSU unit. The output data from this mode is the status of 24 scan points in the ATRF frame.

The sequence of events is:

1. SEL INST (operand is bit $14 = 0$, $X = 1$, $Y = 0$, $Z = 2$ to initate the hardware for the scan operation.
2. LDC/CCO scan address of the 24 points to be interrogated. This starts the hardware sequence.
3. A sense ready signal is sent approximately 35 microseconds later.
4. STC/CCI to read the status of all 24 scan points.

The timing required for the operation of the TSU unit under this directive is about 35 microseconds. If no sense ready signal occurs before 50 microseconds, it can be assumed that the hardware is not functioning properly and the application program should change to time out status and initiate a diagnostic process on the unit.

The scan address can be set up to check the hardware self checking facilities. This is usually done through maintenance programs. With these special addresses the hardware causes an error interrupt signal. The correctness of the error can then be checked by analyzing the TSU unit error status word.

The sequence of events in this case is:

1. SEL INST (operand is bit 14 = 0, X = 1, Y = 0, X = 2) to initiate the hardware for the check operation
2. LDC/CCO scan address forr maintenance purposes.
3. An error interrupt signal is sent approximately 30 microseconds later.

If no error interrupt signal occurs the hardware can be assumed not functioning properly and the maintenance program then takes corrective action.

Checking the Directive 1 of N Check Circuit
DIRECTIVE 3

This mode of operation is used to check the proper functioning of the Directive 1 of N Check circuit. It is normally used by maintenance programs. The sequence of events is:
1. SEL INST (operand is bit 14 = 0, X = 1, Y = 0, X = 3) to initiate the hardware for the check operation.
2. LDC/CCO any data. This is required due to hardware organization and starts the hardware sequence.
3. An error interrupt signal is sent approximately 30 microseconds later.

If no hardware response occurs before 50 microseconds, it can be assumed that the hardware is not functioning properly and the maintenance program then takes corrective action.

Switching OFF the TSU unit DIRECTIVE 5

This mode of operation can only be initiated through the reconfiguration program. It is used to switch the TSU unit to the Hardware OFF LINE state. The sequence of events is:
1. SEL INST (operand is bit 14 = 0, X = 1, Y = 1, Y = 0, Z = 5) To switch OFF the TSU unit scanning circuits
2. TSU unit hardware switches OFF. These are relays which take 16.6 ms. to operate correctly.
3. SEL INST (operand is bit 14 = 0, X = 1, Y = 0, Z = 0) to gate the TSU unit status word on the CPU unit data bus.
4. STC/CCI to read the TSU unit error status word after 16.6 ms. have elapsed.

The 3 and 4 steps are necessary to insure that the TSU unit has correctly switched OFF before switching ON the other unit.

The timing required for the operation of the TSU unit under this directive is 16.6 ms. An error interrupt signal may occur before that time. This is due to the hardware and should be ignored until the complete 16.6 ms. have elasped.

Switching ON the TSU unit DIRECTIVE 6

This mode of operation can only be initiated through the reconfiguration program. It is used to switch a TSU unit to the hardware ON LINE state. The sequence of events is:
1. SEL INST (operand is bit 14 = 0, X = 1, Y = 0, Z = 6) to switch ON the TSU unit scanning circuits.
2. TSU unit hardware switches ON. These are relays which take 16.6 ms. to operate correctly.
3. SEL INST (operand is bit 14 = 0, Z = 1, Y = 0, Z = 0) to gate the TSU unit status word on the CPU unit data bus.
4. STC/CCI to read the TSU unit error status word after 16.6 ms. have elapsed.

The 3 and 4 steps are necessary to insure that the TSU unit has correctly switched ON before operating the unit.

The timing required for the operation of the TSU unit under this directive is 16.6 ms.

Due to the hardware being OFF at the beginning of the sequence there is an error interrupt signal. It should be ignored and the TSU unit error status word should be interrogated after 16.6 ms.

Due to the peculiarities and organization of the TSU sub-units A and B (duplex parts feeding simplex part) the application program should insure that the other duplex unit if OFF before switching the unit ON.

Magnetic Tape Unit

General

The TMU unit Ticketing Magnetic Tape Unit consists of the magnetic tape transport and its associated read/write electronics, data buffering, error detection and tape drive control electronics. The transport is a Cook Electric Model 3300 digital magnetic tape transport. The track write/read head assembly writes data in a continuous NEZI Non Return to Zero - IBM mode at 800 characters per inch. The tape is standard ½ inch wide computer tape.

Ticketing data is written in blocks of 15 calls per block. A read after write check for vertical and longitudinal parity is performed on each block. A block is rewritten if an error is detected.

Call data is written in the "single entry" format; that is, all the data pertaining to an individual call is formatted together in one single entry on the tape. The data transfer rate is 4000 tape characters per second using the EBCDIC Extended Binary Coded Decimal Information Interchange Code magnetic tape code.

Magnetic Tape Peripheral Adapter MPA

The MPA adapter controls the Magnetic Tape Transport MTT. It receives instructions and data via the TDB buffer and controls the release of data to the MTT unit. Alternatively it receives data from the MTT unit and controls its transfer to the TDB buffer and hence to the CPU unit. Data sent from the CPU unit to the MPA adapter must be in four word groups.

SEL Instruction for MPA adapter (refer to previous discussion for initial explanation)

MPA Adapter Directives

The X field identifies the peripheral adapter, X field = 2 for the MPA adapter. This is the same for both TDB buffers.

| X Y Z | DIRECTIVE |
|---|---|
| 2 0 0 | Load MPA adapter status into TDB buffer. The CPU unit can now load the status into the CPU unit by executing an STC or CCI instruction. |
| 2 0 1 | *Check Shift Register - maintenance directive - Data is read into the MPA adapter and read back from the output of the MPA shift register. |
| 2 0 2 | *Check Write Register 6 bytes per word - maintenance directive - Date is read into the MPA adapter and read back from the output of the MPA write register. |
| 2 0 3 | *Check Write Register 3 bytes per word - maintenance directive - Data is read into the MPA adapter and read back from the output of the MPA write register. |
| 2 0 4 | Put Transport On Line |
| 2 0 5 | Put Transport Off Line - This directive causes any attempt to use the transport when Off Line to result in an error interrupt signal. |
| 2 0 6 | Stop, Disengage Drive - This directive |

| X Y Z | DIRECTIVE |
|---|---|
|  | disengages the tape drive; it is intended for use with readback of a pre-written tape. |
| 2 0 7 | Accept More Data and Check Parity - maintenance directive - This directive prepares the MPA adapter for the receipt of more data and forces a vertical parity error. |
| 2 1 0 | *Advance Tape - This directive advances the tape 3.75 inches and is used following an error condition prior to retry. |
| 2 1 1 | Accept More Data - This directive prepares the MPA adapter for the receipt of more data. |
| 2 1 2 | *Write Tape Mark - This directive causes the tape mark to be written on tape as an end of file indication. |
| 2 1 3 | *Read Only - This directive causes the unit to read data from the tape and transfer it to the CPU unit. |
| 2 1 4 | Data Block Complete, Read Back, Check LRC - maintenance directive - This directive causes the check characters to be written on tape, an error being forced in the LRC check. It also causes data to be read back to the CPU unit. |
| 2 1 5 | *Output Data 6 bytes per word - This directive sets up the unit for writing a data block and is followed by four words of data. |
| 2 1 6 | *Output Data 3 bytes/word - This directive is identical to 215 except for the byte structure. |
| 2 1 7 | Data Block Complete - This directive causes the check characters to be written on tape. |
| 2 6 4 | Y Field 1 of N Check - maintenance directive - This directive forces an error in the Y field 1 of N Check |

* These are mode instructions; they clear the unit before proceding.

Data Communication (refer to previous discussion for initial explanation)
Status Lines When the directive load MPA adapter status into TDB buffer is executed the following status lines are loaded into the TDB buffer. The CPU unit can then retrieve them by executing an STC or CCI instruction.

| BIT | STATUS |
|---|---|
| 0 | On Line/Off Line - This bit is unaffected by the TDB CLEAR directive. |
| 1 | Transport Ready - This bit is set if AC and DC power are on, the tape is loaded and the door closed. |
| 2 | Write Enable (File Protect) - This bit is set if the file protect ring is present in the supply reel. |
| 3 | Drive Engaged/Disengaged - This bit is set when the pinch roller is engaged. |
| 4 | EOT Sensed/Not Sensed - This bit is set by the end of tape marker. |
| 5 | Check Shift Register - This is an operational mode derived from SEL instructions. |
| 6 | Check Write Register - This is an operational mode derived from SEL instructions. |
| 7 | Advance Tape - This is an operational mode derived from SEL instructions. |
| 8 | 6 Bytes/Word - This is an operational mode derived from SEL instructions. |
| 9 | 3 Bytes/Word - This is an operational mode derived from SEL instructions. |
| 10 | Read Mode - This is an operational mode derived from SEL instructions. |
| 11 | Write Tape Mark - This is an operational mode derived from SEL instructions. |
| 12 | Data Block Complete - This is an operational mode derived from SEL instructions. |
| 13 | Output Data - This is an operational mode derived from SEL instructions. |
| 14 | EOT and BOT (no tape) - This indicates either tape breakage or tape not loaded. |
| 15 | LRC Written - This is applicable only in write mode and indicates that check characters have been written on tape. |
| 16 | Data Available/Not Available - When receiving data this bit is set on receipt of the fourth word. If less than four words are received the data is not written on tape. |
| 17 | Y Field 1 of N Error - This is a check on the Y field data received from the TDB buffer. |
| 18 | Read Pulse Received - This is set when a byte has been read from the tape; it is an aid in determining the meaning of bit 20. |
| 19 | LRC Read - This indicates completion of the handling of a data block. |
| 20 | LRC Overdue - This indicates error check status. |
| 21 | Vertical Parity Error - This indicates error check status. |
| 22 | Longitudinal Parity Error - This indicates error check status. |
| 23 | PA ERROR |

Modes of Operation

Write Mode Operation

The request for more data, in the form of a ready from the TDB buffer allows for a service time of 1½ ms. for the 6 byte structure. If more data is not available at this time hardware fill characters are written on tape.

For the 3 byte structure the service is halved to 0.75 ms. To maintain the minimum IBG there must be at least 25 ms. between disengaging and re-engaging the drive.

Read Mode Operation

Words become available for transfer to the CPU unit every 0.75 ms. If this data is not accepted by the CPU unit at this rate data is lost.

All characters including check characters are fed to the CPU unit. If the CPU unit requires to stop the tape within an inter block gap it must send the stop-disengage drive SEL instruction within 25 ms. of receiving the check characters.

Shared TDB

Under fault conditions the TDB buffer is shared between the MPA adapter and the SPA adapter with the MPA adapter having priority.

DATA RETRIEVAL AND LOADING ARRANGEMENT

Referring now to FIGS. 10 through 17 of the drawings, there is shown the local accounting and program transfer arrangement, which is constructed in accordance with the present invention, and which includes the magnetic tape unit of the local automatic message accounting subsystem as previously described. In accordance with the present invention, the local accounting and program transfer arrangement enables the data processor unit DPU having the central processor CCP to record billing information for ticketing subscribers on magnetic tape via the magnetic tape unit of the local automatic message accounting subsystem. Moreover, in accordance with the present invention, the programs for the system are loaded into the drum memory subsystem via the magnetic tape unit of the local accounting and program transfer arrangement, and programs may be removed or dumped from the system onto magnetic tape via the same magnetic tape unit.

Figure 12:
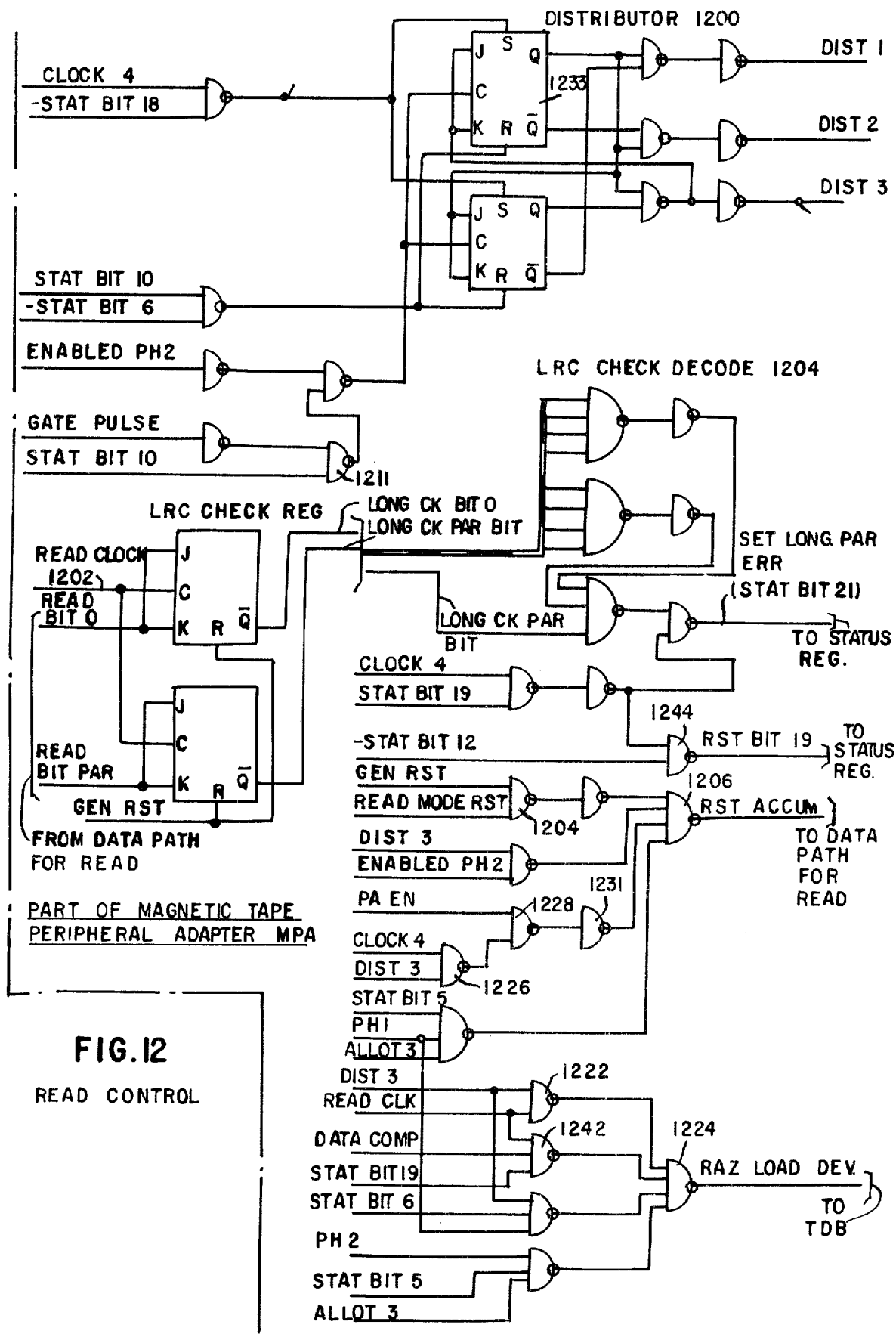

The local accounting and program transfer arrangement of the present invention generally comprises a magnetic tape electronics unit MTE for reading and writing from the magnetic tape and transferring the information to and from the ticketing device buffer TDB of the data processor unit DPU via its multiplex circuit CCX under the control of the magnetic tape peripheral adaptor MPA. For reading information from the magnetic tape, a set of read heads 1000 for reading the information from the tracks of the tape and conveying them to the read amplifiers 1002, which in turn convey the information and store it in a deskew register 1004 for latching the information since the signals read from the tape may not necessarily be recorded in a straight line across the tape. The information stored in the deskew register 1004 is gated via distributor gates 1006 to an accumulator 1008, which stores the data in the magnetic tape peripheral adapter MPA for subsequently transferring the information to the ticketing device buffer register 1010 via the peripheral adapter input multiplex 1212 of the ticketing device buffer TDB, whereby the information may be transferred to the data processor unit DPU via its multiplex circuit CCX. As shown in FIG. 12, a distributor 1200 controls the gating of the signals from the accumulator 1008 by generating the signals DIST 1 through DIST 3 so that the information on the tape may be conveyed in three separate bytes. As shown in FIG. 13, a GATE PULSE train of clock pulses, a READ CLOCK clock pulse train, a RESET DESKEW clock pulse train and a CLOCK 4 clock pulse train are generated by four different clock pulse sources (not shown) of the magnetic tape electronics unit MTE which are started each time a track of data signals are sensed by the read heads and are stopped following the reading of the data information signals. A read clock circuit 1202 and its LRC check decode 1204 count the bits leaving the deskew register 1004 for an entire block of data information so that when the longitudinal redundancy check character LRC is read at the end of a data block, a determination is made whether or not longitudinal parity is proper. As shown in FIG. 14, the CRC character is positioned in each fifth track following the last track of a data block, and the LRC character is positioned at the ninth track following the last track of the data block.

Figure 15A:
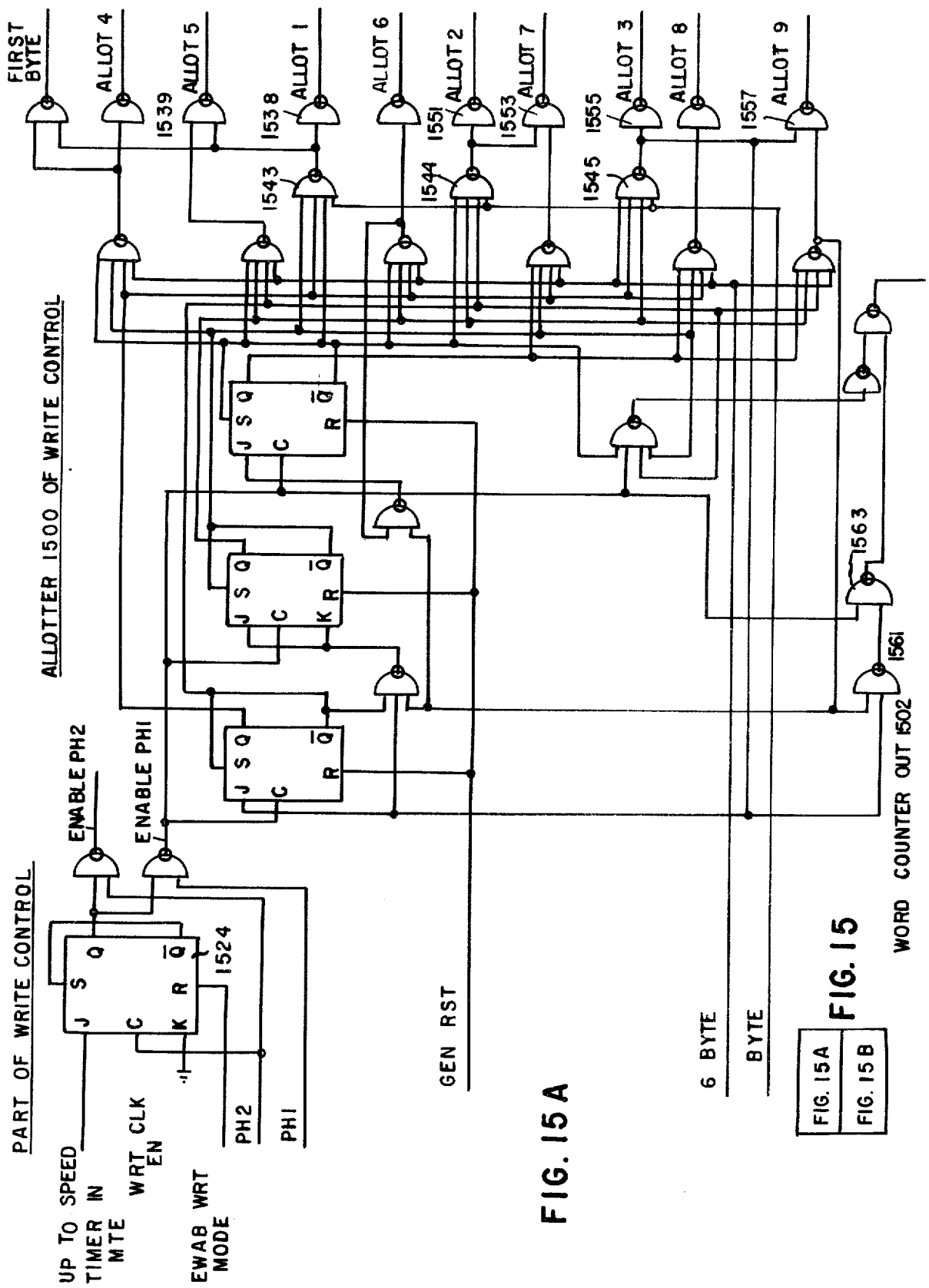

Considering now a write mode of operation, a four word shift register 1014 of the magnetic tape peripheral adaptor MPA transfers information from the data processor unit DPU via the ticketing device buffer register 1010 shifts one character at a time to the write heads 1016 for writing them onto the magnetic tape via byte gates 1018 and a NRZ1 register 1021 to the right amplifiers 1023. As shown in FIG. 15, an allotter 1500 generates signals for controlling the byte gates 1018 for determining whether a three byte mode or a six byte mode of operation is to be performed as hereinafter described in greater detail. Also as shown in FIG. 15, a word counter out 1502 follows the number of words being shifted from the four word shift register 1014 to the write heads, and a word counter in 1504 follows the words being shifted from the ticketing device buffer register 1010 to the four word shift register 1014. Referring now to FIG. 16, a pair of clock sources (not shown) designated as phase 1 and phase 2 generate a series of clock pulses PH1 and PH2 which are out of phase with one another. The PH1 and PH2 clock pulses control the operation and advancement of the allotter 1500. As shown in FIG. 17, a timer 1701 responds to a signal -DTL from the ticketing device buffer indicating that a word is being shifted from the ticketing device buffer register 1010 to the four word shift register, and the timer 1701 produces a delay signal CLK WRD IN to provide sufficient time for the word to be transferred to the four word shift register so that a signal -RST DTL generated by a series of gates 1703 to the ticketing device buffer TDB for resetting a latch DTL (not shown) in the ticketing device buffer TDB. By resetting the latch DTL, the ticketing device buffer TDB is unable to later on shift another word to the four word shift register. The signal CLK WRD IN generated by the timer 1701 also is used to control and advance the counter WORD COUNTER IN 1504, whereby it is advanced each time a word is shifted into the four word shift register. A signal WORD IN 3 generated by a gate 1509 is used to inhibit a gate 1705 of the gates 1703 to prevent the latch DTL from being reset. As a result, during a write mode of operation, four words are transferred from the central processor CCP of the data processor unit DPU via the multiplex CCX to the ticketing device buffer register 1010, and as each word is transferred to that register, it is shifted in parallel to the four word shift register until three words are stored in the four word shift register and the fourth word is located in and remains in the ticketing device buffer register 1010 prior to the writing of the words onto the magnetic tape medium. Thereafter, as described hereinafter in greater detail, the words are shifted sequentially from the four word shift register to the write heads.

Figure 11B:
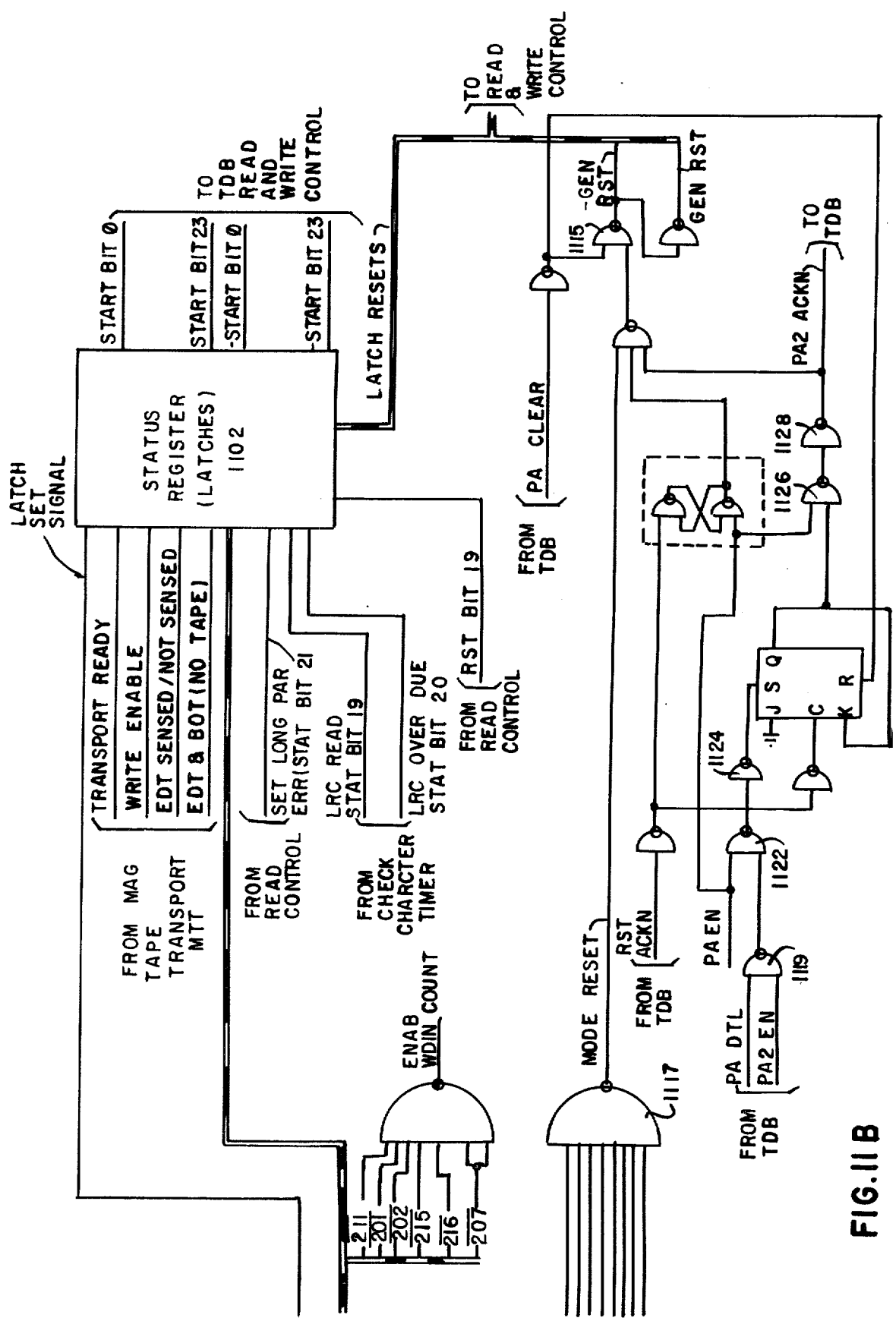

Referring now to FIG. 11, there is shown the directive decode 1100 for the magnetic tape peripheral adaptor MPA. A status register 1102 includes a series of latches for generating the status signals STAT BIT 0 through STAT BIT 23, and -STAT BIT 0 through -STAT BIT 23 in response to certain directives or instructions received from the central processor CCP of the data processor unit DPU. The directives are in the form of three different fields —X, Y and Z. The X field is always equal to the number 2 indicating the magnetic tape unit of the LAMA sub-system, both for ticketing functions and loading and unloading programs. A set of Y field directive decode gates 1104 of the directive decode 1100 decode the Y field received from the ticketing device buffer TDB, and a series of gates 1106 gate the decoded Z field from the ticketing device buffer TDB to the directive N code gates 1108 for generating the 18 directive signals to 00 through 217 for setting the latches of the status register 1102, the signal PA2 EN being the decoded signal from the ticketing device buffer indicating the Z field is equal to 2 for enabling the gates 1106 for the decoded Z field, the decoding gates for the Z field being disposed within the buffer TDB. A one/out/of/N error check circuit 1113 is coupled to the output of the Y field directive decode 1104 for error detection purposes to generate a signal 1 OF N ERROR for setting an appropriate latch in the status register 1102, it being understood that the status register 1102 is able to be monitored by the central processor CCP to determine the status of the magnetic tape peripheral adaptor MPA, the outputs of the status register 1102 also being employed for controlling various circuits of the read and write control for the magnetic tape unit. A gate 1115 generates a signal -GEN RST which serves as a general reset for the status register 1102 and also to reset various different circuits in the magnetic tape peripheral adaptor MPA. A gate 1117 generates a signal MODE RESET in response to certain reset directives received from the central processor CCP via the buffer TDB for enabling the gate 1115 to generate the general reset signal once a latch RESET is set for timing purposes by a signal RST ACKN received from the buffer TDB. A signal PA DTL received from the buffer TDB for enabling a gate 119 serves as an acknowledgment signal from the buffer TDB for setting a latch ACKN via a pair of gates 1122 and 1124, the setting of the latch ACKN causing the generation of a signal PA2 ACKN via a pair of gates 1126 and 1128 for acknowledging the receipt of the acknowledgment signal PA DTL from the device buffer TDB back to that same buffer TDB.

Read Operation considering now the read mode of operation, which mode of operation may be employed for reading programs from the magnetic tape for storage in the drum memory system of the system or the reading operation may be employed for checking the writing of the ticketing information on the tape, instructions are received from the central processor CCP via the multiplex CCX and the device buffer TDB and are in the form of the X, Y and Z fields. As mentioned before, the X field is always decoded as X = 2 for the magnetic tape unit, and thus the signal PA2 EN represents the decoded X field as being X = 2. The Y field is decoded in the adaptor MPA and the Z field was decoded in the decoder (not shown) of the buffer TDB. As each directive is received, a latch of the status register is set and remains set, until the reset directives cause the signal MODE RESET and the latch RESET to produce the signal GEN RST for resetting the status register latches. Thus, before commencing a read operation, the signal GEN RST is generated to clear the status register and enable a gate 1204 of the read control unit to in turn cause the generation of the signal RST ACCUM, the signal RST ACCUM being generated by a gate 1206 to reset the accumulator 1008. The reading of the data block causes the production of a signal GATE PULSE as shown in FIG. 13 to preset the distributor 1200 by enabling the gate 1211, the distributor 1200 being preset to 1 from 0 to generate the signal DIST 1. The signal DIST 1 enables the distributor gates to transfer the first eight bits from the deskew register 1004 to bits 16 through 23 of the accumulator 1008. The pulse RESET DESKEW as shown in FIG. 13 occurs subsequently to reset the deskew register 1004 and receive the next character comprising eight bits plus a ninth parity bit.

The signal DIST 2 causes the next character to be loaded into the bits 8 through 15 of the accumulator 1008. This cycle is repeated until the last character is loaded into the bits 0 through 7 of the accumulator.

After three characters are loaded (during the pulse GATE PULSE), the signals DIST 3 and READ CLK enable the gates 1222 and 1224 to generate the signal PA2 LOAD DEV for notifying the buffer TDB to cause the signal LOAD PA to be generated in the buffer TDB for enabling gates to load all 24 bits from the accumulator 1008 to the ticketing device buffer register, the buffer TDB then generating a READY INTERRUPT for the central processor CCP to indicate a word is available. The deskew register is then reset and the signals CLOCK 4 and DIST 3 enables the gate 1226 to cause the gate 1206 to generate the signal RST ACCUM via the gates 1228 and 1231 for resetting the accumulator, for preparing for the next word. The distributor 1200 does not return to 0 between characters due to the signal DIST 3 preventing the flip-flop 1233 from resetting to 0 and thus it remains at 1.

At the end of a data block, during the read operation the character CRCC (cyclic redundancy check character) is ignored, but the character LRC (longitudinal redundancy check character) causes the signal STAT BIT 19 to be generated, whereby the signal PA2 LOAD DEV is generated by the gate 1224 and the gate 1242 for the buffer TDB after the signal GATE PULSE causes the loading of the LRC character into the accumulator, whereby the signal PA2 LOAD DEV causes the signal LOAD PA to gate the character LRC to the ticketing device buffer TDB.

When the signal CLOCK 4 is generated, the signal RST BIT 19 is generated by the gate 1244 to clear the status register, the signal -STATUS BIT 12 being 0 during writing and being 1 during the reading operation. Such an operation is repeated for each data block.

Write Operation

Considering now the write mode of operation, the writing of information onto the magnetic tape may be performed for the purpose of preparing ticketing billing information or for dumping or removing programs from the system. The operation commences by receiving either an instruction 215 indicating a six byte mode of operation or an instruction 216 indicating a three byte mode of operation. The receipt of such an instruction causes the gate 1117 to be enabled for the purpose of causing the gate 1115 to generate the signal -GEN RST for clearing the status register 1102 (the status register being designed to clear all of the latches previously set by the general reset signal -GEN RST except the latch being currently set — in this case either the latch 215 or the latch 216). Thereafter, the interlock between the magnetic tape peripheral adaptor MPA and the buffer TDB is performed by the receipt of the signal PA DTL to set the latch ACKN for the purpose of generating the signal PA 2 ACKN for the buffer TDB. Thereafter, once the tape has come up to speed and the first word is received in the ticketing device buffer register, the signal SHIFT IN is generated by the gates 1043 for enabling a gate 1045 to advance the four word shift register 1014. The next word received in the ticketing device buffer register 1010 from the central processor CCP is written over the first word in that buffer since there is only capacity for a single word in the register 1010. After three words have been received, the gate 1509 of the word counter and 1504 generates the signal WORD IN 3 to inhibit the gate 1705 for the purpose of inhibiting the signal -RST DTL from being generated by the gate 1703 and thus requesting additional words. Moreover, the signal WORD IN 3 inhibits the gates 1043.

After four words have been shifted into the four word shift register 1014 and the ticketing device buffer register 1010 (three words being stored in the four word shift register 1014 and one word being stored in the buffer register 1010), the up-to-speed timer (not shown) of the magnetic tape electronic unit generates a signal WRT CLK IN to set a flip-flop 1524 upon the occurrence of the next PH2 signal. Gate 1526 is enabled by a directive from the central precessor CCP to set a latch of the status register for generating the signal STAT BIT 16, whereby a signal SHIFT OUT enables the gate 1045 for advancing the four word shift register 1014. In this regard, the status bit 16 latch of the status register is set in response to a signal SET DATA AVAIL (SET STAT BIT 16) generated by a gate 1528 in response to the signals PA DTL and PA 2 EN from the buffer TDB to enable gates 1531 and 1533, which in turn enable the gate 1528, the signal PA DTL being true since the latch for generating that signal in the ticketing device buffer TDB was not reset on the fourth word due to the inhibiting of the gate 1705 by the signal WORD IN 3. The WORD COUNTER OUT counter 1502 is incremented by the signal -STAT BIT 16 for every signal STEP WORD OUT generated by the gate 1535 in response to the advancing of the allotter 1500 as driven by the signal ENABLED PH1.

At the beginning of the operation, the signal ENABLED PH1 advances the allotter 1500 from 0 to 1 to advance the WORD COUNTER OUT counter 1502 to 1 and shift the first word from the device buffer register into the fourth stage of the four word shift register 1014.

At this point, it is now necessary to consider which byte mode of operation is occurring. Therefore, it will now be assumed that a three byte mode of operation has been requested by the central processor CCP. In this regard, for a three byte mode of operation, three sets of eight data bits are sequentially transferred from the fourth position comprising flip-flops 1051 through 1075 of the four word shift register 1014 via the byte gates 1018 to the NRZ1 register 1021. In the three byte mode of operation, the gates 1538 and 1539 generate the respective signals ALLOT 1 and ALLOT 5 in response to the allotter 1500 being set to 1 and the signal 3 BYTE enabling the gates 1543, 1544 and 1545 for the three byte mode of operation. The signals ALLOT 1 and ALLOT 5 enable certain ones of the byte gates 1018 to tranfer two 4-bit words at the same time from the 24 bits of the fourth position comprising flip-flops 1051 through 1075 of the four word shift register 1014 when the signal PH1 becomes true. The signal PH2 causes the flip-flop to be set for the purpose of generating the signal -ENABLED PH2 for toggling the NRZ1 register 1021 by enabling the gates 1072 and 1075. As a result, the NRZ1 register 1021 enables the write amplifiers 1023 associated with the two 4-bit words and thus to activate the corresponding write heads so that one byte of information is written onto the tape.

The signal PH1 thereafter increments the allotter 1500 from 1 to a count of 2, whereby the signals ALLOT 2 and ALLOT 7 are generated simultaneously by the corresponding gates 1551 and 1553. Thereafter, the signal PH2 causes the writing of the second character comprising eight bits to be written on the tape in the same manner as described above in connection with the first 8-bit character. Thereafter, the cycle is then repeated for the third character. The third character is transferred onto the tape when the gates 1555 and 1557 generate the respective signals ALLOT 3 and ALLOT 9. The signal ALLOT 3 prevents the advancing of the allotter 1500 to a count of 0 so that the condition of the allotter returns to a count of 1. The signal ALLOT 3 also causes the generation of the signal STEP WORD OUT via the gate 1535 in response to the gates 1561 and 1563, whereby the signal STEP WORD OUT enables the gate 1526 to generate the signal SHIFT OUT for advancing the word contained in the third position of the four word shift register 1014 to the fourth position, and the signal STEP WORD OUT advances the WORD COUNTER OUT counter 1502. Thereafter, the cycle is repeated for the following words contained in the four word shift register.

Assuming now that the six byte mode of operation has been instructed by the central processor CCP, a signal -STAT BIT 8 generated by the status register in response to an appropriate directive to determine the type of decode for the allotter 1500 for generating the signal ENAB FILL BITS, which in turn enables four gates 1080 through 1083 for causing the generation of data signals one for four bits to serve as a fill. The four bits are the most significant bits of the eight bits being written on the tape. The remainder of the operation is similar to the operation for the three byte mode, except that six 4-bits are written onto the tape with four fill ones and four data bits for each position. Therefore, the 8-bit data characters are written on the tape six different times. As described previously, the six byte mode of operation is desirable for ticketing purposes, and the three byte mode of operation is normally used for program transfer operations due to the faster operation.

Considering now the null character operation, the signal LAST WORD generated by the flip-flop 1571 of the WORD COUNTER OUT counter 1502 enables the gate 1722 for causing the gate 1724 of the gate 1703 to generate the signal PA2 SET READY for the ticketing device buffer TDB. Moreover, the signal LAST WORD causes the resetting of the flip-flops 1051 through 1075 of the four stop position of the four word shift register 1014. Should the ticketing device buffer not send another word and the signal -STAT BIT 16 is cleared at the same time, no signal -DTL is returned from the buffer TDB due to the lack of a word being available as a result of a malfunction or any other reason, whereby the signal ENAB FILL BITS is inhibited during the six byte mode of operation. As a result, all zeros are written onto the tape since the four fill bits are inhibited. These all zeros or null characters are interpreted as being non-credible information. During a three byte mode of operation, the fill bits are not employed and therefore all zeros are written onto the tape without the necessity of having to inhibit any signals.

Referring now to FIG. 18, there is shown the check character timer 1800 for monitoring the check characters following a data block. A signal -ENAB WRT MODE enables a pair of gates 1802 and 1804 for generating a signal COUNTER RST for starting a counter 1806 of the timer 18 (the counter 1806 serving as a timer). The signal COUNTER RST is generated in response to a directive and starts the counter following a data block of information so that when it reaches a count of 7, it generates a signal COUNT 7 corresponding to the CRC character position on the tape. In this regard, the CRC character is written into the fourth position, since the count of 7 includes both track positions and non-track positions on the tape. When the counter timer 1806 reaches the count of 15 to generate the signal COUNT 15, the LRC character is written into the eighth position on the tape.

What is claimed is:

1. In a communication switching system having a switching network for establishing communication paths selectively between calling and called lines, common equipment having memory means adapted for containing program information for facilitating the controlling of the establishment of the paths, scanning means for monitoring busy paths for ticketing purposes, the common equipment for generating ticketing information in response to said scanning means and for storing it in said memory means, a data retrieval and loading arrangement comprising:

information storage means adapted to be operatively coupled to the system for transferring the ticketing information from said memory means and for storing said ticketing information therein, and said information storage means further adapted for selectively transferring the program information from said memory means and for storing said program information therein;

adapter means responsive to the common equipment for conveying said ticketing information and said program information to said storage means for storage therein; and status means responsive to directive information from the common equipment for controlling said adapter means to transfer to said information storage means either said ticketing information or said program information.

2. A data retrieval and loading arrangement according to claim 1, wherein said adapter means conveys new program information from said information storage means to the common equipment for storage in said memory means under the control of said status means.

3. A data retrieval and loading arrangement according to claim 2, wherein said information storage means includes a magnetic tape recording device.

4. A data retrieval and loading arrangement according to claim 3, further including a write shift register used for transferring information to said recording device.

5. A data retrieval and loading arrangement according to claim 4, further including a device buffer register for storing information and for transferring it one word at a time to said four word shift register.

6. A data retrieval and loading arrangement according to claim 5, further including a read register for transferring information one word at a time from said recording device to said device buffer register for storage in said memory means.

7. A data retrieval and loading arrangement according to claim 6, further including a deskew register for storing information from said recording device and for transferring it to said read register.

8. A data retrieval and loading arrangement according to claim 7, wherein said recording device includes information storing magnetic tape and read and write heads therefor.

9. A data retrieval and loading arrangement according to claim 4, wherein said write shift register prepares one word of information at a time for transfer to said recording device, further including byte gates for transferring portions of the words seriatim to said recording device.

10. A data retrieval and loading arrangement according to claim 9, further including a byte allotter for controlling said byte gates so that either N number of portions of the words for ticketing information transfer or M number of portions of the words for program information transfer are conveyed seriatim from said write shift register.

11. A data retrieval and loading arrangement according to claim 10, wherein said M number is 3 and said N number is 6.

12. A data retrieval and loading arrangement according to claim 11, further including means for generating fill bits of information to be combined with said portions of said ticketing information.

13. A data retrieval and loading arrangement according to claim 11, further including a non-return to zero change at one register for receiving information from said byte gates and for transferring it to said recording device.

* * * * *